(12) United States Patent
Zhu

(10) Patent No.: US 9,776,678 B2
(45) Date of Patent: Oct. 3, 2017

(54) SELF-BALANCING VEHICLES

(71) Applicant: TWO WHEELS TECHNOLOGY, CO., LTD., Daxing District, Beijing (CN)

(72) Inventor: Lingyun Zhu, Beijing (CN)

(73) Assignee: TWO WHEELS TECHNOLOGY, CO., LTD., Beijing (CN)

( * ) Notice: Subject to any disclaimer, the term of this patent is extended or adjusted under 35 U.S.C. 154(b) by 0 days.

(21) Appl. No.: 15/072,271

(22) Filed: Mar. 16, 2016

(65) Prior Publication Data

US 2017/0043831 A1    Feb. 16, 2017

Related U.S. Application Data

(63) Continuation of application No. PCT/CN2015/086524, filed on Aug. 10, 2015.

(51) Int. Cl.
*B60L 7/00* (2006.01)
*B62H 7/00* (2006.01)
*B62H 1/10* (2006.01)
*B62H 1/12* (2006.01)
*B62D 37/06* (2006.01)
(Continued)

(52) U.S. Cl.
CPC ............... *B62H 7/00* (2013.01); *B62D 37/06* (2013.01); *B62D 61/04* (2013.01); *B62D 61/125* (2013.01); *B62H 1/10* (2013.01); *B62H 1/12* (2013.01); *B60L 2260/34* (2013.01)

(58) Field of Classification Search
CPC ... B62H 7/00; B62H 1/12; B62H 1/10; B62D 61/04; B62D 61/125; B62D 37/06; B60L 2260/34
See application file for complete search history.

(56) References Cited

U.S. PATENT DOCUMENTS

| 796,893 A | 8/1905 | Brennan |
| 3,124,007 A | 3/1964 | Swinney |
| 3,461,811 A | 8/1969 | Swinney |

(Continued)

FOREIGN PATENT DOCUMENTS

| CN | 1361038 A | 7/2002 |
| CN | 203032844 U | 7/2013 |

(Continued)

OTHER PUBLICATIONS

Akinlua, et al. Gyroscopic Stabilization of Unstable Vehicles. Department of Mechanical Engineering, University of Michigan. Apr. 17, 2007.

(Continued)

*Primary Examiner* — Jelani Smith
*Assistant Examiner* — Jordan S Fei
(74) *Attorney, Agent, or Firm* — Wilson Sonsini Goodrich & Rosati

(57) ABSTRACT

The present disclosure provides systems, methods, and devices for providing stability to a vehicle using one or more auxiliary support members on the vehicle, such as lateral sides of the vehicle. The auxiliary support members may extend away from the vehicle body to approach and/or touch a support surface and provide stability and in some cases additional centripetal force to facilitate steering of the vehicle. The auxiliary support members may also retract towards the vehicle.

28 Claims, 15 Drawing Sheets

(51) Int. Cl.
*B62D 61/04* (2006.01)
*B62D 61/12* (2006.01)

(56) References Cited

U.S. PATENT DOCUMENTS

| | | | |
|---|---|---|---|
| 3,700,059 A | 10/1972 | Sutton | |
| 4,691,798 A | 9/1987 | Engelbach | |
| 4,826,194 A | 5/1989 | Sakita | |
| 5,181,740 A | 1/1993 | Horn | |
| 5,259,571 A | 11/1993 | Blazquez | |
| 5,839,386 A | 11/1998 | Frieling et al. | |
| 5,904,218 A * | 5/1999 | Watkins | B62D 61/02 180/209 |
| 2004/0098185 A1 | 5/2004 | Wang | |
| 2005/0035583 A1* | 2/2005 | Hinton | B62D 61/04 280/755 |
| 2005/0088045 A1* | 4/2005 | Fondriest | H02G 3/0481 307/147 |
| 2007/0024275 A1* | 2/2007 | Rudd | H03K 17/9505 324/207.26 |
| 2010/0274445 A1* | 10/2010 | Haynes | B62H 1/12 701/36 |
| 2013/0054126 A1* | 2/2013 | Lazzari | B62D 37/06 701/124 |

FOREIGN PATENT DOCUMENTS

| | | |
|---|---|---|
| CN | 203767011 U | 8/2014 |
| CN | 104443194 A | 3/2015 |
| DE | 3442574 C2 | 7/1994 |
| EP | 1137568 B1 | 5/2003 |

OTHER PUBLICATIONS

Boddiford, et al. Experiments to validate the use of a control moment gyroscope (CMG) to turn robots. Proceedings of the ASME 2013 International Design Engineering Technical Conferences and Computers and Information in Engineering Conferences. Aug. 4-7, 2013. 8 pages.

Colvin. Development and validation of control movement gyroscopic stabilization. Department of Mechanical and Aerospace Engineering, Ohio State University. Feb. 2014. 29 pages.

Townsend, et al. Gyrostabilizier vehicular technology. Applied Mechanical Reviews. Jan. 2011; 64:010801-1-14.

International search report and written opinion dated Apr. 22, 2016 for PCT/CN2015/086524.

* cited by examiner

SELF-BALANCING VEHICLES

CROSS-REFERENCE

This application is a continuation of International Application No. PCT/CN2015/086524, filed on Aug. 10, 2015, which is entirely incorporated herein by reference.

BACKGROUND

A vehicle is a mobile machine that is capable of transporting objects from one point to another. A vehicle may be used in various settings, such as commercial, personal or recreational settings. A vehicle typically includes a form of locomotion, such as an engine (e.g., internal combustion, compressed gas, or electric motor), which may allow displacement or translation of the vehicle from one point to another. Such locomotion may include a power source to provide the required kinetic energy, in addition to features that enable the vehicle to control motion, such as a braking and steering system.

Examples of vehicles include two, three and four-wheeled vehicles. A two-wheeled vehicle typically has two wheels each in contact with a support surface, such as a road. A three-wheeled vehicle typically has three wheels that are each in contact with the support surface, and a four-wheeled vehicle typically has four wheels that are each in contact with the support surface.

Two-wheeled vehicles may include locomotion, such as an engine. As an alternative, a two-wheeled vehicle may not include an engine, but may be self-powered by a user—such two-wheeled vehicle may be a bicycle. A two-wheeled vehicle may include other components that enable reliable use, such as self-balancing features that enable the two-wheeled vehicle to balance on a support surface with little or no effort from a user. Two-wheeled vehicles may be widely used in manned or unmanned transportation for the public, military, and recreational uses, due at least in part to their improved maneuverability, power consumption, size and flexibility with respect to four-wheeled vehicles.

SUMMARY

Despite the presence of two-wheeled vehicles, recognized here are various, non-limiting issues with two-wheeled vehicles currently available. The safety of two-wheeled vehicles is a long-term unsolved issue. For example, a two-wheeled vehicle may fall or flip over if it enters a sharp corner at high speed. If such two-wheeled vehicle includes a self-balancing device, the self-balancing device may fail if an angle of tilt exceeds a threshold with respect to the gravitational acceleration vector. As another example, some two-wheeled vehicles have self-balancing devices that function when the two-wheeled vehicle is operational, which results in wasted energy when the two-wheeled vehicle is in a parked stated. In order to increase stability of two-wheeled vehicles including self-balancing two-wheeled vehicles and traditional two-wheeled vehicles, it may be desirable to receive auxiliary support when the vehicle is likely to lose stability. The present disclosure provides systems and methods for providing stability to two-wheeled vehicles by providing at least two auxiliary support members on lateral sides of the vehicle. In some instances, the balancing or self-balancing device or member of a self-balancing vehicle, such as a control moment gyroscope (CMG), a flywheel or a shifting weight of the self-balancing two-wheeled vehicles, may fail due to a mechanical fault. Under such circumstances, the auxiliary support members may extend away from the vehicle body to come in contact with ground and contribute to stability to the vehicle.

In other instances, the balancing member may reach a limit of providing stability if the vehicle is steering a sharp angle with a high speed. In this case, the auxiliary support members may extend away from the vehicle body, contribute to stability to the vehicle and exert additional centripetal force to assist the steering. The auxiliary support members may also be useful when the self-balancing vehicles are stationary. For instance, the auxiliary support members may extend to support the vehicle when the vehicle is parking so as to save power consumption. The auxiliary support members may retract towards the vehicle after the balancing member recovers or the vehicle is restored to a normal orientation under which the vehicle is capable of self-balancing.

The present disclosure also provides systems and methods for providing auxiliary stability to traditional two-wheeled vehicles. At least two auxiliary support members may be provided on lateral sides of the two-wheeled vehicle, and may extend to touch the ground if a degree of tilt of the vehicle with respect to ground exceeds a predetermined with respect to the gravitational acceleration vector. The auxiliary support members may retract towards the vehicle after the vehicle is restored to a normal orientation.

In an aspect of the present disclosure, a self-balancing vehicle may comprise: a vehicle body having a longitudinal axis; at least two wheels aligned substantially along the longitudinal axis, wherein each of the at least two wheels may be configured to support the vehicle body against a support surface; at least two auxiliary support members coupled to the vehicle body, wherein the at least two auxiliary support members may extend away from and/or retract towards the vehicle body independently from one another, wherein each of the at least two auxiliary support members may contribute to stability of the vehicle body with respect to the support surface; at least one balancing member coupled to the vehicle body, wherein the balancing member may facilitate self-balancing of the vehicle body against the support surface; and a controller in communication with the at least two auxiliary support members and the at least one balancing member, wherein the controller may comprise one or more computer processors that are individually or collectively programmed to direct at least one of the at least two auxiliary support members to extend away from and/or retract towards the vehicle body based upon an operating state or change thereof of the vehicle, which operating state may be selected from the group consisting of an operating state of the at least one balancing member and an orientation of the vehicle body with respect to a gravitational acceleration vector, thereby stabilizing the vehicle body with respect to the support surface.

In some embodiments, the one or more computer processors may be individually or collectively programmed to detect the operating state or change thereof of the vehicle. In some embodiments, the operating state of the at least one balancing member may be an operational state, a faulty state or a non-operational state.

In some embodiments, the at least two auxiliary support members may be coupled to separate sides of the vehicle body. In some embodiments, the at least two auxiliary support members maybe coupled to opposite sides of the vehicle body. In some embodiments, the at least two auxiliary support members may be oppositely oriented with respect to the longitudinal axis.

In some embodiments, the balancing member may facilitate balancing of the vehicle body against the support surface when the at least two auxiliary support members are not in contact with the support surface.

In some embodiments, at least one of the at least two auxiliary support members may include an auxiliary wheel that is configured to contact the support surface. In some embodiments, each of the at least two auxiliary support members may include an auxiliary wheel that is configured to contact the support surface. In some embodiments, the auxiliary wheel may be steerable.

In some embodiments, at least one of the at least two auxiliary support members may include an auxiliary track that is configured to contact the support surface. In some embodiments, each of the at least two auxiliary support members may include an auxiliary track that is configured to contact the support surface. In some embodiments, the auxiliary track may be steerable.

In some embodiments, the at least one of the at least two auxiliary support members may include a telescopic rod. In some embodiments, the telescopic rod may be a hydraulic retractable rod. Alternatively, the at least one of the at least two auxiliary support members may include a foldable rod.

In some embodiments, the state of the at least one balancing member may be indicative of the balancing member being in a faulty state or non-operational state, and wherein the one or more computer processors may be individually or collectively programmed to direct the at least two auxiliary support members to extend away from the vehicle body to provide stability to the vehicle body against the support surface when the balancing member is in the faulty state or non-operational state. In some embodiments, the one or more computer processors may be individually or collectively programmed to direct the at least two auxiliary support members to extend at substantially the same length from the vehicle body. In some embodiments, when extended, the at least two auxiliary support members may be coplanar with the at least two wheels. Alternatively, when extended, at least one of the at least two auxiliary support members may be coplanar with the at least two wheels. In some embodiments, the one or more computer processors may be individually or collectively programmed to determine an elongation length of each of the at least two auxiliary support members with respect to the vehicle body according to a degree of tilt of the vehicle body with respect to the support surface. In some embodiments, an elongation length of each of the at least two auxiliary support members with respect to the vehicle body may be different while the vehicle is steering. In some embodiments, each of the at least two auxiliary support members may include an auxiliary wheel that is configured to contact the support surface. In some embodiments, the auxiliary wheels may be steerable.

In some embodiments, the state of the at least one balancing member may be indicative of the balancing member being in an operational state, and the one or more computer processors may be individually or collectively programmed to (i) detect the orientation of the vehicle body with respect to a gravitational acceleration vector, and (ii) direct at least one of the at least two auxiliary support members to extend away from the vehicle body to provide stability to the vehicle body against the support surface when the orientation of the vehicle body with respect to a gravitational acceleration vector reaches a predetermined orientation threshold. In some embodiments, the predetermined orientation threshold may be 30 degrees. In some embodiments, the one or more computer processors may be individually or collectively programmed to direct at least one of the at least two auxiliary support members to extend away from the vehicle body to provide stability to the vehicle body against the support surface before the orientation of the vehicle body has achieved the predetermined orientation threshold. Alternatively, the one or more computer processors may be individually or collectively programmed to direct the at least one of the at least two auxiliary support members to extend away from the vehicle body to provide stability to the vehicle body with respect to the support surface upon the orientation of the vehicle body having achieved the predetermined orientation threshold. Alternatively, the one or more computer processors may be individually or collectively programmed to direct the at least one of the at least two auxiliary support members to extend away from the vehicle body to provide stability to the vehicle body with respect to the support surface when the orientation of the vehicle body has achieved the predetermined orientation threshold. Alternatively, the one or more computer processors may be individually or collectively programmed to direct the at least one of the at least two auxiliary support members to extend away from the vehicle body to restore the vehicle body to an orientation which is less than the predetermined orientation threshold. In some embodiments, the one or more computer processors may be individually or collectively programmed to direct the at least one of the at least two auxiliary support members to retract towards the vehicle body after the vehicle body is restored to the orientation which is less than the predetermined orientation threshold.

In some embodiments, the at least one balancing member may include a control moment gyroscope (CMG). In some embodiments, the operating state of the CMG may be determined based upon whether a gimbal angle of the CMG with respect to the vehicle body reaches a predetermined gimbal angle limit. In some embodiments, the predetermined gimbal angle limit may be ±45 degrees.

In some embodiments, the at least one balancing member may include a flywheel. In some embodiments, the operating state of the flywheel may be determined based upon whether an angular rotating velocity of the flywheel reaches a predetermined angular rotating velocity limit. In some embodiments, the predetermined angular rotating velocity limit may be 5000 rpm.

In some embodiments, the at least one self-balancing member may include a shifting weight. In some embodiments, the shifting weight may be movable in a traverse direction substantially perpendicular to the longitudinal axis of the vehicle body. In some embodiments, the operating state of the shifting weight may be determined based upon whether a mass of the shifting weight reaches a sliding end. In some embodiments, the operating state of the shifting weight may be determined based upon whether a mass of the shifting weight reaches a predetermined position on the sliding rod on which the mass slides. In some examples, the operating state of the shifting weight may be determined based upon whether a mass of the shifting weight reaches or exceeds a position that is less than 20% of a length of the sliding rod to the sliding end.

In some embodiments, the self-balancing vehicle may further comprise a motor that provides translational motion to the vehicle body. In some embodiments, the motor is an internal combustion engine. Alternatively, the motor may be an electric motor. In some embodiments, the motor may be operatively coupled to at least one of the at least two wheels. Alternatively, the motor may be operatively coupled to the at least two wheels. In some embodiments, the at least two wheels may be operatively coupled to one another.

In some embodiments, at least one of the at least two wheels may be steerable. Alternatively, the at least two wheels may be steerable. In some embodiments, the at least two wheels may be independently steerable. Alternatively, the at least two wheels may be concertedly steerable.

In some embodiments, the balancing member may provide self-balancing to the vehicle body while the vehicle body is moving with respect to the support surface. In some embodiments, the balancing member may provide self-balancing to the vehicle body while the vehicle body is stationary with respect to the support surface. Alternatively, the balancing member may not provide self-balancing to the vehicle body while the vehicle body is stationary with respect to the support surface.

In some embodiments, the one or more computer processors may be individually or collectively programmed to direct at least one of the at least two auxiliary support members to extend away from the vehicle body to provide stability to the vehicle body against the support surface when the vehicle body is stationary with respect to the support surface. In some embodiments, the one or more computer processors may be individually or collectively programmed to direct the balancing member to provide self-balancing to the vehicle body while the vehicle body has transitioned from a stationary state to a moving state with respect to the support surface. In some embodiments, the one or more computer processors may be individually or collectively programmed to detect when the vehicle body is capable of self-balancing with the aid of the balancing member, and direct the at least one of the at least two auxiliary support members to retract towards the vehicle body when the vehicle body is capable of self-balancing. In some embodiments, the one or more computer processors may be individually or collectively programmed to detect when a velocity or change thereof of the vehicle body with respect to the support surface exceeds a threshold, and direct the at least one of the at least two auxiliary support members to retract towards the vehicle body when the velocity or change thereof of the vehicle body exceeds the threshold. In some embodiments, the threshold velocity may be 10 km/hour. In some embodiments, the one or more computer processors may be individually or collectively programmed to detect a velocity or change thereof of the vehicle with respect to the support surface, and direct at least one of the at least two auxiliary support members to extend away from the vehicle body to provide stability to the vehicle body against the support surface when the velocity or change thereof of the vehicle body is below a threshold. In some embodiments, the threshold may be 10 km/hour.

In some embodiments, the at least one balancing member may comprise a plurality of balancing members. In some embodiments, the plurality of balancing members may comprise a first balancing member adjacent to a second balancing member. In some embodiments, the first balancing member may be adjacent to the second balancing member along an axis that is orthogonal to the longitudinal axis. Alternatively, the first balancing member may be adjacent to the second balancing member along the longitudinal axis. In some embodiments, the first balancing member and second balancing member include masses that rotate in opposite directions.

In some embodiments, the self-balancing vehicle may further comprise one or more sensors on at least one of the at least two auxiliary support members. In some embodiments, the one or more sensors may include a proximity sensor that detects proximity to the support surface. In some embodiments, the proximity sensor may be disposed at a distal end of the at least one of the at least two auxiliary support members. In some embodiments, the one or more computer processors may be individually or collectively programmed to determine a speed of elongation of the at least one of the at least two auxiliary support members with respect to the vehicle body. In some embodiments, the one or more sensors may include a stress sensor that detects stress on the at least one of the at least two auxiliary support members. In some embodiments, the stress sensor may be disposed on a shaft of an auxiliary wheel that is at a distal end of the at least one of the at least two auxiliary support members, which auxiliary wheel may be configured to contact the support surface. In some embodiments, the one or more computer processors may be individually or collectively programmed to determine a state of stability of the vehicle with respect to the support surface. In some embodiments, the one or more sensors may include a proximity sensor that detects proximity to the support surface and a stress sensor that detects stress on the at least one of the at least two auxiliary support members. In some embodiments, the one or more sensors may be integrated with the at least one of the at least two auxiliary support members.

In another aspect of the present disclosure, a vehicle may comprise: a vehicle body having a longitudinal axis; at least two wheels aligned substantially along the longitudinal axis, wherein each of the at least two wheels may be configured to support the vehicle body against a support surface; at least one sensor that may measure a degree of tilt and a change thereof of the vehicle body with respect to the support surface; at least two auxiliary support members coupled to the vehicle body, wherein the at least two auxiliary support members may extend away from and/or retract towards the vehicle body independently from one another, wherein each of the at least two auxiliary support members may contribute to stability of the vehicle body with respect to the support surface; and a controller operatively coupled to the at least two auxiliary support members and the at least one sensor, wherein the controller may comprise one or more computer processors that are individually or collectively programmed to direct at least one of the at least two auxiliary support members to extend away from and/or retract towards the vehicle body based on the degree of tilt or change thereof of the vehicle body with respect to a gravitational acceleration vector.

In some embodiments, the one or more computer processors may be individually or collectively programmed to receive a signal from the at least one sensor, which signal may be indicative of the degree of tilt or change thereof.

In some embodiments, the at least two auxiliary support members may be coupled to separate sides of the vehicle body. In some embodiments, the at least two auxiliary support members may be coupled to opposite sides of the vehicle body. In some embodiments, the at least two auxiliary support members may be oppositely oriented with respect to the longitudinal axis.

In some embodiments, at least one of the at least two auxiliary support members may include an auxiliary wheel that is configured to contact the support surface. In some embodiments, each of the at least two auxiliary support members may include an auxiliary wheel that is configured to contact the support surface. In some embodiments, the auxiliary wheels may be steerable.

In some embodiments, the at least one sensor may include a gyroscope that measures a degree of tilt or change thereof of the vehicle body with respect to the gravitational acceleration vector. In some embodiments, the vehicle may further comprise a proximity sensor that detects proximity to the support surface and a stress sensor that detects stress on the at least one of the at least two auxiliary support members. In some embodiments, the one or more computer processors may be individually or collectively programmed to combine data from the proximity sensor and the stress sensor to determine a speed of elongation of the at least one of the at least two auxiliary support members with respect to the vehicle body. In some embodiments, the one or more computer processors may be individually or collectively programmed to combine data from the proximity sensor and the stress sensor to determine a state of stability of the vehicle with respect to the support surface. In some embodiments, the at least one sensor may be integrated with the at least one of the at least two auxiliary support members.

In some embodiments, the one or more computer processors may be individually or collectively programmed to direct at least one of the at least two auxiliary support members to extend away from the vehicle body when the degree of tilt of the vehicle body with respect to the gravitational acceleration vector exceeds a predetermined threshold. In some embodiments, the predetermined threshold may be 30 degrees. In some embodiments, the degree of tilt may include a degree of tilt change with time.

In another aspect of the present disclosure, a method for operating a self-balancing vehicle may comprise: (a) monitoring an operating state of the self-balancing vehicle adjacent to a support surface, wherein the self-balancing vehicle may comprise (i) a vehicle body having a longitudinal axis, (ii) at least two wheels aligned substantially along the longitudinal axis, wherein each of the at least two wheels may support the vehicle body against the support surface, (iii) at least two auxiliary support members coupled to the vehicle body, wherein the at least two auxiliary support members may extend away from and/or retract towards the vehicle body independently from one another, and wherein each of the at least two auxiliary support members may contribute to stability of the vehicle body with respect to the support surface; and (iv) at least one balancing member coupled to the vehicle body, wherein the balancing member may facilitate self-balancing of the vehicle body against the support surface, and wherein the operating state may be selected from the group consisting of a state of the at least one balancing member and an orientation of the vehicle body with respect to a gravitational acceleration vector; and (b) directing at least one of the at least two auxiliary support members to extend away from and/or retract towards the vehicle body based upon the operating state or change thereof of the vehicle, thereby stabilizing the vehicle body with respect to the support surface.

In some embodiments, the monitoring may comprise detecting the operating state or change thereof of the self-balancing vehicle. In some embodiments, the operating state of the at least one balancing member may be an operational state, a faulty state or a non-operational state.

In some embodiments, the at least two auxiliary support members may be coupled to separate sides of the vehicle body. In some embodiments, the at least two auxiliary support members maybe coupled to opposite sides of the vehicle body. In some embodiments, the at least two auxiliary support members may be oppositely oriented with respect to the longitudinal axis. In some embodiments, the at least two auxiliary support members may be oppositely oriented with respect to the longitudinal axis.

In some embodiments, the balancing member may facilitate balancing of the vehicle body against the support surface when the at least two auxiliary support members are not in contact with the support surface.

In some embodiments, at least one of the at least two auxiliary support members may include an auxiliary wheel that is configured to contact the support surface. In some embodiments, each of the at least two auxiliary support members may include an auxiliary wheel that is configured to contact the support surface. In some embodiments, the auxiliary wheel may be steerable.

In some embodiments, at least one of the at least two auxiliary support members may include an auxiliary track that is configured to contact the support surface. In some embodiments, each of the at least two auxiliary support members may include an auxiliary track that is configured to contact the support surface. In some embodiments, the auxiliary track may be steerable.

In some embodiments, the at least one of the at least two auxiliary support members may include a telescopic rod. In some embodiments, the telescopic rod may be a hydraulic retractable rod. Alternatively, the at least one of the at least two auxiliary support members may include a foldable rod.

In some embodiments, the state of the at least one balancing member may be indicative of the balancing member being in a faulty state or non-operational state, and wherein the directing may comprise directing the at least two auxiliary support members to extend away from the vehicle body to provide stability to the vehicle body against the support surface when the balancing member is in the faulty state or non-operational state. In some embodiments, the directing may comprise directing the at least two auxiliary support members to extend at substantially the same length from the vehicle body. In some embodiments, when extended, the at least two auxiliary support members may be coplanar with the at least two wheels. Alternatively, when extended, at least one of the at least two auxiliary support members may be coplanar with the at least two wheels. In some embodiments, the method may further comprise, prior to the directing, determining an elongation length of each of the at least two auxiliary support members with respect to the vehicle body according to a degree of tilt of the vehicle body with respect to the support surface. In some embodiments, an elongation length of each of the at least two auxiliary support members with respect to the vehicle body may be different while the vehicle is steering. In some embodiments, each of the at least two auxiliary support members may include an auxiliary wheel that is configured to contact the support surface. In some embodiments, the auxiliary wheels may be steerable.

In some embodiments, the state of the at least one balancing member may be indicative of the balancing member being in an operational state, and the one or more computer processors may be individually or collectively programmed to (i) detect the orientation of the vehicle body with respect to a gravitational acceleration vector, and (ii) direct at least one of the at least two auxiliary support members to extend away from the vehicle body to provide stability to the vehicle body against the support surface when the orientation of the vehicle body with respect to a gravitational acceleration vector reaches a predetermined orientation threshold. In some embodiments, the predetermined orientation threshold may be 30 degrees. In some embodiments, the directing may comprise directing at least one of the at least two auxiliary support members to extend away from the vehicle body to provide stability to the vehicle body against the support surface before the orientation of the vehicle body has achieved the predetermined orientation threshold. Alternatively, the directing may comprise directing the at least one of the at least two auxiliary support members to extend away from the vehicle body to provide stability to the vehicle body with respect to the support surface upon the orientation of the vehicle body having achieved the predetermined orientation threshold. Alternatively, the directing may comprise directing the at least one of the at least two auxiliary support members to extend away from the vehicle body to provide stability to the vehicle body with respect to the support surface when the orientation of the vehicle body has achieved the predetermined orientation threshold. Alternatively, the directing may comprise directing the at least one of the at least two auxiliary support members to extend away from the vehicle body to restore the vehicle body to an orientation which is less than the predetermined orientation threshold. In some embodiments, the directing may comprise directing the at least one of the at least two auxiliary support members to retract towards the vehicle body after the vehicle body is restored to the orientation which is less than the predetermined orientation threshold.

In some embodiments, the at least one balancing member may include a control moment gyroscope (CMG). In some embodiments, the operating state of the CMG may be determined based upon whether a gimbal angle of the CMG with respect to the vehicle body reaches a predetermined gimbal angle limit. In some embodiments, the predetermined gimbal angle limit may be ±45 degrees.

In some embodiments, the at least one balancing member may include a flywheel. In some embodiments, the operating state of the flywheel may be determined based upon whether an angular rotating velocity of the flywheel reaches a predetermined angular rotating velocity limit. In some embodiments, the predetermined angular rotating velocity limit may be 5000 rpm.

In some embodiments, the at least one self-balancing member may include a shifting weight. In some embodiments, the shifting weight may be movable in a traverse direction substantially perpendicular to the longitudinal axis of the vehicle body. In some embodiments, the operating state of the shifting weight may be determined based upon whether a mass of the shifting weight reaches a sliding end. In some embodiments, the operating state of the shifting weight may be determined based upon whether a mass of the shifting weight reaches a predetermined position on the sliding rod on which the mass slides. In some examples, the operating state of the shifting weight may be determined based upon whether a mass of the shifting weight reaches or exceeds a position that is less than 20% of a length of the sliding rod to the sliding end.

In some embodiments, the self-balancing vehicle may further comprise a motor that provides translational motion to the vehicle body. In some embodiments, the motor is an internal combustion engine. Alternatively, the motor may be an electric motor. In some embodiments, the motor may be operatively coupled to at least one of the at least two wheels. Alternatively, the motor may be operatively coupled to the at least two wheels. In some embodiments, the at least two wheels may be operatively coupled to one another.

In some embodiments, at least one of the at least two wheels may be steerable. Alternatively, the at least two wheels may be steerable. In some embodiments, the at least two wheels may be independently steerable. Alternatively, the at least two wheels may be concertedly steerable.

In some embodiments, the balancing member may provide self-balancing to the vehicle body while the vehicle body is moving with respect to the support surface. In some embodiments, the balancing member may provide self-balancing to the vehicle body while the vehicle body is stationary with respect to the support surface. Alternatively, the balancing member may not provide self-balancing to the vehicle body while the vehicle body is stationary with respect to the support surface.

In some embodiments, the directing may comprise directing at least one of the at least two auxiliary support members to extend away from the vehicle body to provide stability to the vehicle body against the support surface when the vehicle body is stationary with respect to the support surface. In some embodiments, the directing may comprise directing the balancing member to provide self-balancing to the vehicle body while the vehicle body has transitioned from a stationary state to a moving state with respect to the support surface. In some embodiments, the monitoring may comprise detecting when the vehicle body is capable of self-balancing with the aid of the balancing member, and the directing may comprise directing the at least one of the at least two auxiliary support members to retract towards the vehicle body when the vehicle body is capable of self-balancing. In some embodiments, the monitoring may comprise detecting when a velocity or change thereof of the vehicle body with respect to the support surface exceeds a threshold, and the directing may comprise directing the at least one of the at least two auxiliary support members to retract towards the vehicle body when the velocity or change thereof of the vehicle body exceeds the threshold. In some embodiments, the threshold velocity may be 10 km/hour. In some embodiments, the monitoring may comprise detecting a velocity or change thereof of the vehicle with respect to the support surface, and the directing may comprise directing at least one of the at least two auxiliary support members to extend away from the vehicle body to provide stability to the vehicle body against the support surface when the velocity or change thereof of the vehicle body is below a threshold. In some embodiments, the threshold may be 10 km/hour.

In some embodiments, the at least one balancing member may comprise a plurality of balancing members. In some embodiments, the plurality of balancing members may comprise a first balancing member adjacent to a second balancing member. In some embodiments, the first balancing member may be adjacent to the second balancing member along an axis that is orthogonal to the longitudinal axis. Alternatively, the first balancing member may be adjacent to the second balancing member along the longitudinal axis. In some embodiments, the first balancing member and second balancing member include masses that rotate in opposite directions.

In some embodiments, the self-balancing vehicle may further comprise one or more sensors on at least one of the at least two auxiliary support members. In some embodiments, the one or more sensors may include a proximity sensor that detects proximity to the support surface. In some embodiments, the proximity sensor may be disposed at a distal end of the at least one of the at least two auxiliary support members. In some embodiments, the method may further comprise, prior to the directing, determining a speed of elongation of the at least one of the at least two auxiliary support members with respect to the vehicle body. In some embodiments, the one or more sensors may include a stress sensor that detects stress on the at least one of the at least two auxiliary support members. In some embodiments, the stress sensor may be disposed on a shaft of an auxiliary wheel that is at a distal end of the at least one of the at least two auxiliary support members, which auxiliary wheel may be configured to contact the support surface. In some embodiments, the directing may comprise determining a state of stability of the vehicle with respect to the support surface. In some embodiments, the one or more sensors may include a proximity sensor that detects proximity to the support surface and a stress sensor that detects stress on the at least one of the at least two auxiliary support members. In some embodiments, the one or more sensors may be integrated with the at least one of the at least two auxiliary support members.

In another aspect of the present disclosure, a method for operating a vehicle may comprise: (a) monitoring a degree of tilt or change thereof of a vehicle body of the vehicle with respect to a support surface, wherein the vehicle may comprise (i) the vehicle body having a longitudinal axis, (ii) at least two wheels aligned substantially along the longitudinal axis, wherein each of the at least two wheels may support the vehicle body against the support surface, (iii) at least one sensor that measures the degree of tilt and a change thereof with respect to a gravitational acceleration vector, and (iv) at least two auxiliary support members coupled to the vehicle body, wherein the at least two auxiliary support members may extend away from and/or retract towards the vehicle body independently from one another, wherein each of the at least two auxiliary support members may contribute to stability of the vehicle body with respect to the support surface; and (b) directing at least one of the at least two auxiliary support members to extend away from and/or retract towards the vehicle body based on the degree of tilt or change thereof of the vehicle body with respect to the gravitational acceleration vector.

In some embodiments, the method may further comprise, prior to (b), receiving a signal from the at least one sensor, which signal may be indicative of the degree of tile or change thereof of the vehicle body.

In some embodiments, the at least two auxiliary support members may be coupled to separate sides of the vehicle body. In some embodiments, the at least two auxiliary support members may be coupled to opposite sides of the vehicle body. In some embodiments, the at least two auxiliary support members may be oppositely oriented with respect to the longitudinal axis.

In some embodiments, at least one of the at least two auxiliary support members may include an auxiliary wheel that is configured to contact the support surface. In some embodiments, each of the at least two auxiliary support members may include an auxiliary wheel that is configured to contact the support surface. In some embodiments, the auxiliary wheels may be steerable.

In some embodiments, the at least one sensor may include a gyroscope that measures a degree of tilt or change thereof of the vehicle body with respect to the gravitational acceleration vector. In some embodiments, the vehicle may further comprise a proximity sensor that detects proximity to the support surface and a stress sensor that detects stress on the at least one of the at least two auxiliary support members. In some embodiments, the method may further comprise, prior to (b), combining data from the proximity sensor and the stress sensor to determine a speed of elongation of the at least one of the at least two auxiliary support members with respect to the vehicle body. In some embodiments, the method may further comprise, prior to (b), combining data from the proximity sensor and the stress sensor to determine a state of stability of the vehicle with respect to the support surface. In some embodiments, the at least one sensor may be integrated with the at least one of the at least two auxiliary support members.

In some embodiments, the directing may comprise directing at least one of the at least two auxiliary support members to extend away from the vehicle body when the degree of tilt of the vehicle body with respect to the gravitational acceleration vector exceeds a predetermined threshold. In some embodiments, the predetermined threshold may be 30 degrees. In some embodiments, the degree of tilt may include a degree of tilt change with time.

In another aspect of the present disclosure, a control system may comprise one or more computer processors that are individually or collectively programmed to implement a method for operating a self-balancing vehicle, the method comprising: (a) monitoring an operating state of the self-balancing vehicle adjacent to a support surface, wherein the self-balancing vehicle may comprise (i) a vehicle body having a longitudinal axis, (ii) at least two wheels aligned substantially along the longitudinal axis, wherein each of the at least two wheels may support the vehicle body against the support surface, (iii) at least two auxiliary support members coupled to the vehicle body, wherein the at least two auxiliary support members may extend away from and/or retract towards the vehicle body independently from one another, and wherein each of the at least two auxiliary support members may contribute to stability of the vehicle body with respect to the support surface; and (iv) at least one balancing member coupled to the vehicle body, wherein the balancing member may facilitate self-balancing of the vehicle body against the support surface, and wherein the operating state may be selected from the group consisting of a state of the at least one balancing member and an orientation of the vehicle body with respect to a gravitational acceleration vector; and (b) directing at least one of the at least two auxiliary support members to extend away from and/or retract towards the vehicle body based upon the operating state or change thereof of the vehicle, thereby stabilizing the vehicle body with respect to the support surface.

In some embodiments, the monitoring may comprise detecting the operating state or change thereof of the self-balancing vehicle. In some embodiments, the operating state of the at least one balancing member may be an operational state, a faulty state or a non-operational state.

In some embodiments, the at least two auxiliary support members may be coupled to separate sides of the vehicle body. In some embodiments, the at least two auxiliary support members maybe coupled to opposite sides of the vehicle body. In some embodiments, the at least two auxiliary support members may be oppositely oriented with respect to the longitudinal axis. In some embodiments, the at least two auxiliary support members may be oppositely oriented with respect to the longitudinal axis.

In some embodiments, the balancing member may facilitate balancing of the vehicle body against the support surface when the at least two auxiliary support members are not in contact with the support surface.

In some embodiments, at least one of the at least two auxiliary support members may include an auxiliary wheel that is configured to contact the support surface. In some embodiments, each of the at least two auxiliary support members may include an auxiliary wheel that is configured to contact the support surface. In some embodiments, the auxiliary wheel may be steerable.

In some embodiments, at least one of the at least two auxiliary support members may include an auxiliary track that is configured to contact the support surface. In some embodiments, each of the at least two auxiliary support members may include an auxiliary track that is configured to contact the support surface. In some embodiments, the auxiliary track may be steerable.

In some embodiments, the at least one of the at least two auxiliary support members may include a telescopic rod. In some embodiments, the telescopic rod may be a hydraulic retractable rod. Alternatively, the at least one of the at least two auxiliary support members may include a foldable rod.

In some embodiments, the state of the at least one balancing member may be indicative of the balancing member being in a faulty state or non-operational state, and wherein the directing may comprise directing the at least two auxiliary support members to extend away from the vehicle body to provide stability to the vehicle body against the support surface when the balancing member is in the faulty state or non-operational state. In some embodiments, the directing may comprise directing the at least two auxiliary support members to extend at substantially the same length from the vehicle body. In some embodiments, when extended, the at least two auxiliary support members may be coplanar with the at least two wheels. Alternatively, when extended, at least one of the at least two auxiliary support members may be coplanar with the at least two wheels. In some embodiments, the method may further comprise, prior to the directing, determining an elongation length of each of the at least two auxiliary support members with respect to the vehicle body according to a degree of tilt of the vehicle body with respect to the support surface. In some embodiments, an elongation length of each of the at least two auxiliary support members with respect to the vehicle body may be different while the vehicle is steering. In some embodiments, each of the at least two auxiliary support members may include an auxiliary wheel that is configured to contact the support surface. In some embodiments, the auxiliary wheels may be steerable.

In some embodiments, the state of the at least one balancing member may be indicative of the balancing member being in an operational state, and the one or more computer processors may be individually or collectively programmed to (i) detect the orientation of the vehicle body with respect to a gravitational acceleration vector, and (ii) direct at least one of the at least two auxiliary support members to extend away from the vehicle body to provide stability to the vehicle body against the support surface when the orientation of the vehicle body with respect to a gravitational acceleration vector reaches a predetermined orientation threshold. In some embodiments, the predetermined orientation threshold may be 30 degrees. In some embodiments, the directing may comprise directing at least one of the at least two auxiliary support members to extend away from the vehicle body to provide stability to the vehicle body against the support surface before the orientation of the vehicle body has achieved the predetermined orientation threshold. Alternatively, the directing may comprise directing the at least one of the at least two auxiliary support members to extend away from the vehicle body to provide stability to the vehicle body with respect to the support surface upon the orientation of the vehicle body having achieved the predetermined orientation threshold. Alternatively, the directing may comprise directing the at least one of the at least two auxiliary support members to extend away from the vehicle body to provide stability to the vehicle body with respect to the support surface when the orientation of the vehicle body has achieved the predetermined orientation threshold. Alternatively, the directing may comprise directing the at least one of the at least two auxiliary support members to extend away from the vehicle body to restore the vehicle body to an orientation which is less than the predetermined orientation threshold. In some embodiments, the directing may comprise directing the at least one of the at least two auxiliary support members to retract towards the vehicle body after the vehicle body is restored to the orientation which is less than the predetermined orientation threshold.

In some embodiments, the at least one balancing member may include a control moment gyroscope (CMG). In some embodiments, the operating state of the CMG may be determined based upon whether a gimbal angle of the CMG with respect to the vehicle body reaches a predetermined gimbal angle limit. In some embodiments, the predetermined gimbal angle limit may be ±45 degrees.

In some embodiments, the at least one balancing member may include a flywheel. In some embodiments, the operating state of the flywheel may be determined based upon whether an angular rotating velocity of the flywheel reaches a predetermined angular rotating velocity limit. In some embodiments, the predetermined angular rotating velocity limit may be 5000 rpm.

In some embodiments, the at least one self-balancing member may include a shifting weight. In some embodiments, the shifting weight may be movable in a traverse direction substantially perpendicular to the longitudinal axis of the vehicle body. In some embodiments, the operating state of the shifting weight may be determined based upon whether a mass of the shifting weight reaches a sliding end. In some embodiments, the operating state of the shifting weight may be determined based upon whether a mass of the shifting weight reaches a predetermined position on the sliding rod on which the mass slides. In some examples, the operating state of the shifting weight may be determined based upon whether a mass of the shifting weight reaches or exceeds a position that is less than 20% of a length of the sliding rod to the sliding end.

In some embodiments, the self-balancing vehicle may further comprise a motor that provides translational motion to the vehicle body. In some embodiments, the motor is an internal combustion engine. Alternatively, the motor may be an electric motor. In some embodiments, the motor may be operatively coupled to at least one of the at least two wheels. Alternatively, the motor may be operatively coupled to the at least two wheels. In some embodiments, the at least two wheels may be operatively coupled to one another.

In some embodiments, at least one of the at least two wheels may be steerable. Alternatively, the at least two wheels may be steerable. In some embodiments, the at least two wheels may be independently steerable. Alternatively, the at least two wheels may be concertedly steerable.

In some embodiments, the balancing member may provide self-balancing to the vehicle body while the vehicle body is moving with respect to the support surface. In some embodiments, the balancing member may provide self-balancing to the vehicle body while the vehicle body is stationary with respect to the support surface. Alternatively, the balancing member may not provide self-balancing to the vehicle body while the vehicle body is stationary with respect to the support surface.

In some embodiments, the directing may comprise directing at least one of the at least two auxiliary support members to extend away from the vehicle body to provide stability to the vehicle body against the support surface when the vehicle body is stationary with respect to the support surface. In some embodiments, the directing may comprise directing the balancing member to provide self-balancing to the vehicle body while the vehicle body has transitioned from a stationary state to a moving state with respect to the support surface. In some embodiments, the monitoring may comprise detecting when the vehicle body is capable of self-balancing with the aid of the balancing member, and the directing may comprise directing the at least one of the at least two auxiliary support members to retract towards the vehicle body when the vehicle body is capable of self-balancing. In some embodiments, the monitoring may comprise detecting when a velocity or change thereof of the vehicle body with respect to the support surface exceeds a threshold, and the directing may comprise directing the at least one of the at least two auxiliary support members to retract towards the vehicle body when the velocity or change thereof of the vehicle body exceeds the threshold. In some embodiments, the threshold velocity may be 10 km/hour. In some embodiments, the monitoring may comprise detecting a velocity or change thereof of the vehicle with respect to the support surface, and the directing may comprise directing at least one of the at least two auxiliary support members to extend away from the vehicle body to provide stability to the vehicle body against the support surface when the velocity or change thereof of the vehicle body is below a threshold. In some embodiments, the threshold may be 10 km/hour.

In some embodiments, the at least one balancing member may comprise a plurality of balancing members. In some embodiments, the plurality of balancing members may comprise a first balancing member adjacent to a second balancing member. In some embodiments, the first balancing member may be adjacent to the second balancing member along an axis that is orthogonal to the longitudinal axis. Alternatively, the first balancing member may be adjacent to the second balancing member along the longitudinal axis. In some embodiments, the first balancing member and second balancing member include masses that rotate in opposite directions.

In some embodiments, the self-balancing vehicle may further comprise one or more sensors on at least one of the at least two auxiliary support members. In some embodiments, the one or more sensors may include a proximity sensor that detects proximity to the support surface. In some embodiments, the proximity sensor may be disposed at a distal end of the at least one of the at least two auxiliary support members. In some embodiments, the method may further comprise, prior to the directing, determining a speed of elongation of the at least one of the at least two auxiliary support members with respect to the vehicle body. In some embodiments, the one or more sensors may include a stress sensor that detects stress on the at least one of the at least two auxiliary support members. In some embodiments, the stress sensor may be disposed on a shaft of an auxiliary wheel that is at a distal end of the at least one of the at least two auxiliary support members, which auxiliary wheel may be configured to contact the support surface. In some embodiments, the directing may comprise determining a state of stability of the vehicle with respect to the support surface. In some embodiments, the one or more sensors may include a proximity sensor that detects proximity to the support surface and a stress sensor that detects stress on the at least one of the at least two auxiliary support members. In some embodiments, the one or more sensors may be integrated with the at least one of the at least two auxiliary support members.

In another aspect of the present disclosure, a control system may comprise one or more computer processors that are individually or collectively programmed to implement a method for operating a vehicle, the method comprising: (a) monitoring a degree of tilt or change thereof of a vehicle body of the vehicle with respect to a support surface, wherein the vehicle may comprise (i) the vehicle body having a longitudinal axis, (ii) at least two wheels aligned substantially along the longitudinal axis, wherein each of the at least two wheels may support the vehicle body against the support surface, (iii) at least one sensor that measures the degree of tilt and a change thereof with respect to a gravitational acceleration vector, and (iv) at least two auxiliary support members coupled to the vehicle body, wherein the at least two auxiliary support members may extend away from and/or retract towards the vehicle body independently from one another, wherein each of the at least two auxiliary support members may contribute to stability of the vehicle body with respect to the support surface; and (b) directing at least one of the at least two auxiliary support members to extend away from and/or retract towards the vehicle body based on the degree of tilt or change thereof of the vehicle body with respect to the gravitational acceleration vector.

In some embodiments, the method may further comprise, prior to (b), receiving a signal from the at least one sensor, which signal may be indicative of the degree of tile or change thereof of the vehicle body.

In some embodiments, the at least two auxiliary support members may be coupled to separate sides of the vehicle body. In some embodiments, the at least two auxiliary support members may be coupled to opposite sides of the vehicle body. In some embodiments, the at least two auxiliary support members may be oppositely oriented with respect to the longitudinal axis.

In some embodiments, at least one of the at least two auxiliary support members may include an auxiliary wheel that is configured to contact the support surface. In some embodiments, each of the at least two auxiliary support members may include an auxiliary wheel that is configured to contact the support surface. In some embodiments, the auxiliary wheels may be steerable.

In some embodiments, the at least one sensor may include a gyroscope that measures a degree of tilt or change thereof of the vehicle body with respect to the gravitational acceleration vector. In some embodiments, the vehicle may further comprise a proximity sensor that detects proximity to the support surface and a stress sensor that detects stress on the at least one of the at least two auxiliary support members. In some embodiments, the method may further comprise, prior to (b), combining data from the proximity sensor and the stress sensor to determine a speed of elongation of the at least one of the at least two auxiliary support members with respect to the vehicle body. In some embodiments, the method may further comprise, prior to (b), combining data from the proximity sensor and the stress sensor to determine a state of stability of the vehicle with respect to the support surface. In some embodiments, the at least one sensor may be integrated with the at least one of the at least two auxiliary support members.

In some embodiments, the directing may comprise directing at least one of the at least two auxiliary support members to extend away from the vehicle body when the degree of tilt of the vehicle body with respect to the gravitational acceleration vector exceeds a predetermined threshold. In some embodiments, the predetermined threshold may be 30 degrees. In some embodiments, the degree of tilt may include a degree of tilt change with time.

In another aspect of the present disclosure, a non-transitory computer readable medium may comprise machine executable code that, upon execution by one or more computer processors, implements a method for operating a self-balancing vehicle, the method comprising: (a) monitoring an operating state of the self-balancing vehicle adjacent to a support surface, wherein the self-balancing vehicle may comprise (i) a vehicle body having a longitudinal axis, (ii) at least two wheels aligned substantially along the longitudinal axis, wherein each of the at least two wheels may support the vehicle body against the support surface, (iii) at least two auxiliary support members coupled to the vehicle body, wherein the at least two auxiliary support members may extend away from and/or retract towards the vehicle body independently from one another, and wherein each of the at least two auxiliary support members may contribute to stability of the vehicle body with respect to the support surface; and (iv) at least one balancing member coupled to the vehicle body, wherein the balancing member may facilitate self-balancing of the vehicle body against the support surface, and wherein the operating state may be selected from the group consisting of a state of the at least one balancing member and an orientation of the vehicle body with respect to a gravitational acceleration vector; and (b) directing at least one of the at least two auxiliary support members to extend away from and/or retract towards the vehicle body based upon the operating state or change thereof of the vehicle, thereby stabilizing the vehicle body with respect to the support surface.

In some embodiments, the monitoring may comprise detecting the operating state or change thereof of the self-balancing vehicle. In some embodiments, the operating state of the at least one balancing member may be an operational state, a faulty state or a non-operational state.

In some embodiments, the at least two auxiliary support members may be coupled to separate sides of the vehicle body. In some embodiments, the at least two auxiliary support members maybe coupled to opposite sides of the vehicle body. In some embodiments, the at least two auxiliary support members may be oppositely oriented with respect to the longitudinal axis. In some embodiments, the at least two auxiliary support members may be oppositely oriented with respect to the longitudinal axis.

In some embodiments, the balancing member may facilitate balancing of the vehicle body against the support surface when the at least two auxiliary support members are not in contact with the support surface.

In some embodiments, at least one of the at least two auxiliary support members may include an auxiliary wheel that is configured to contact the support surface. In some embodiments, each of the at least two auxiliary support members may include an auxiliary wheel that is configured to contact the support surface. In some embodiments, the auxiliary wheel may be steerable.

In some embodiments, at least one of the at least two auxiliary support members may include an auxiliary track that is configured to contact the support surface. In some embodiments, each of the at least two auxiliary support members may include an auxiliary track that is configured to contact the support surface. In some embodiments, the auxiliary track may be steerable.

In some embodiments, the at least one of the at least two auxiliary support members may include a telescopic rod. In some embodiments, the telescopic rod may be a hydraulic retractable rod. Alternatively, the at least one of the at least two auxiliary support members may include a foldable rod.

In some embodiments, the state of the at least one balancing member may be indicative of the balancing member being in a faulty state or non-operational state, and wherein the directing may comprise directing the at least two auxiliary support members to extend away from the vehicle body to provide stability to the vehicle body against the support surface when the balancing member is in the faulty state or non-operational state. In some embodiments, the directing may comprise directing the at least two auxiliary support members to extend at substantially the same length from the vehicle body. In some embodiments, when extended, the at least two auxiliary support members may be coplanar with the at least two wheels. Alternatively, when extended, at least one of the at least two auxiliary support members may be coplanar with the at least two wheels. In some embodiments, the method may further comprise, prior to the directing, determining an elongation length of each of the at least two auxiliary support members with respect to the vehicle body according to a degree of tilt of the vehicle body with respect to the support surface. In some embodiments, an elongation length of each of the at least two auxiliary support members with respect to the vehicle body may be different while the vehicle is steering. In some embodiments, each of the at least two auxiliary support members may include an auxiliary wheel that is configured to contact the support surface. In some embodiments, the auxiliary wheels may be steerable.

In some embodiments, the state of the at least one balancing member may be indicative of the balancing member being in an operational state, and the one or more computer processors may be individually or collectively programmed to (i) detect the orientation of the vehicle body with respect to a gravitational acceleration vector, and (ii) direct at least one of the at least two auxiliary support members to extend away from the vehicle body to provide stability to the vehicle body against the support surface when the orientation of the vehicle body with respect to a gravitational acceleration vector reaches a predetermined orientation threshold. In some embodiments, the predetermined orientation threshold may be 30 degrees. In some embodiments, the directing may comprise directing at least one of the at least two auxiliary support members to extend away from the vehicle body to provide stability to the vehicle body against the support surface before the orientation of the vehicle body has achieved the predetermined orientation threshold. Alternatively, the directing may comprise directing the at least one of the at least two auxiliary support members to extend away from the vehicle body to provide stability to the vehicle body with respect to the support surface upon the orientation of the vehicle body having achieved the predetermined orientation threshold. Alternatively, the directing may comprise directing the at least one of the at least two auxiliary support members to extend away from the vehicle body to provide stability to the vehicle body with respect to the support surface when the orientation of the vehicle body has achieved the predetermined orientation threshold. Alternatively, the directing may comprise directing the at least one of the at least two auxiliary support members to extend away from the vehicle body to restore the vehicle body to an orientation which is less than the predetermined orientation threshold. In some embodiments, the directing may comprise directing the at least one of the at least two auxiliary support members to retract towards the vehicle body after the vehicle body is restored to the orientation which is less than the predetermined orientation threshold.

In some embodiments, the at least one balancing member may include a control moment gyroscope (CMG). In some embodiments, the operating state of the CMG may be determined based upon whether a gimbal angle of the CMG with respect to the vehicle body reaches a predetermined gimbal angle limit. In some embodiments, the predetermined gimbal angle limit may be ±45 degrees.

In some embodiments, the at least one balancing member may include a flywheel. In some embodiments, the operating state of the flywheel may be determined based upon whether an angular rotating velocity of the flywheel reaches a predetermined angular rotating velocity limit. In some embodiments, the predetermined angular rotating velocity limit may be 5000 rpm.

In some embodiments, the at least one self-balancing member may include a shifting weight. In some embodiments, the shifting weight may be movable in a traverse direction substantially perpendicular to the longitudinal axis of the vehicle body. In some embodiments, the operating state of the shifting weight may be determined based upon whether a mass of the shifting weight reaches a sliding end. In some embodiments, the operating state of the shifting weight may be determined based upon whether a mass of the shifting weight reaches a predetermined position on the sliding rod on which the mass slides. In some examples, the operating state of the shifting weight may be determined based upon whether a mass of the shifting weight reaches or exceeds a position that is less than 20% of a length of the sliding rod to the sliding end.

In some embodiments, the self-balancing vehicle may further comprise a motor that provides translational motion to the vehicle body. In some embodiments, the motor is an internal combustion engine. Alternatively, the motor may be an electric motor. In some embodiments, the motor may be operatively coupled to at least one of the at least two wheels. Alternatively, the motor may be operatively coupled to the at least two wheels. In some embodiments, the at least two wheels may be operatively coupled to one another.

In some embodiments, at least one of the at least two wheels may be steerable. Alternatively, the at least two wheels may be steerable. In some embodiments, the at least two wheels may be independently steerable. Alternatively, the at least two wheels may be concertedly steerable.

In some embodiments, the balancing member may provide self-balancing to the vehicle body while the vehicle body is moving with respect to the support surface. In some embodiments, the balancing member may provide self-balancing to the vehicle body while the vehicle body is stationary with respect to the support surface. Alternatively, the balancing member may not provide self-balancing to the vehicle body while the vehicle body is stationary with respect to the support surface.

In some embodiments, the directing may comprise directing at least one of the at least two auxiliary support members to extend away from the vehicle body to provide stability to the vehicle body against the support surface when the vehicle body is stationary with respect to the support surface. In some embodiments, the directing may comprise directing the balancing member to provide self-balancing to the vehicle body while the vehicle body has transitioned from a stationary state to a moving state with respect to the support surface. In some embodiments, the monitoring may comprise detecting when the vehicle body is capable of self-balancing with the aid of the balancing member, and the directing may comprise directing the at least one of the at least two auxiliary support members to retract towards the vehicle body when the vehicle body is capable of self-balancing. In some embodiments, the monitoring may comprise detecting when a velocity or change thereof of the vehicle body with respect to the support surface exceeds a threshold, and the directing may comprise directing the at least one of the at least two auxiliary support members to retract towards the vehicle body when the velocity or change thereof of the vehicle body exceeds the threshold. In some embodiments, the threshold velocity may be 10 km/hour. In some embodiments, the monitoring may comprise detecting a velocity or change thereof of the vehicle with respect to the support surface, and the directing may comprise directing at least one of the at least two auxiliary support members to extend away from the vehicle body to provide stability to the vehicle body against the support surface when the velocity or change thereof of the vehicle body is below a threshold. In some embodiments, the threshold may be 10 km/hour.

In some embodiments, the at least one balancing member may comprise a plurality of balancing members. In some embodiments, the plurality of balancing members may comprise a first balancing member adjacent to a second balancing member. In some embodiments, the first balancing member may be adjacent to the second balancing member along an axis that is orthogonal to the longitudinal axis. Alternatively, the first balancing member may be adjacent to the second balancing member along the longitudinal axis. In some embodiments, the first balancing member and second balancing member include masses that rotate in opposite directions.

In some embodiments, the self-balancing vehicle may further comprise one or more sensors on at least one of the at least two auxiliary support members. In some embodiments, the one or more sensors may include a proximity sensor that detects proximity to the support surface. In some embodiments, the proximity sensor may be disposed at a distal end of the at least one of the at least two auxiliary support members. In some embodiments, the method may further comprise, prior to the directing, determining a speed of elongation of the at least one of the at least two auxiliary support members with respect to the vehicle body. In some embodiments, the one or more sensors may include a stress sensor that detects stress on the at least one of the at least two auxiliary support members. In some embodiments, the stress sensor may be disposed on a shaft of an auxiliary wheel that is at a distal end of the at least one of the at least two auxiliary support members, which auxiliary wheel may be configured to contact the support surface. In some embodiments, the directing may comprise determining a state of stability of the vehicle with respect to the support surface. In some embodiments, the one or more sensors may include a proximity sensor that detects proximity to the support surface and a stress sensor that detects stress on the at least one of the at least two auxiliary support members. In some embodiments, the one or more sensors may be integrated with the at least one of the at least two auxiliary support members.

In another aspect of the present disclosure, a non-transitory computer readable medium may comprise machine executable code that, upon execution by one or more computer processors, implements a method for operating a vehicle, the method comprising: (a) monitoring a degree of tilt or change thereof of a vehicle body of the vehicle with respect to a support surface, wherein the vehicle may comprise (i) the vehicle body having a longitudinal axis, (ii) at least two wheels aligned substantially along the longitudinal axis, wherein each of the at least two wheels may support the vehicle body against the support surface, (iii) at least one sensor that measures the degree of tilt and a change thereof with respect to a gravitational acceleration vector, and (iv) at least two auxiliary support members coupled to the vehicle body, wherein the at least two auxiliary support members may extend away from and/or retract towards the vehicle body independently from one another, wherein each of the at least two auxiliary support members may contribute to stability of the vehicle body with respect to the support surface; and (b) directing at least one of the at least two auxiliary support members to extend away from and/or retract towards the vehicle body based on the degree of tilt or change thereof of the vehicle body with respect to the gravitational acceleration vector.

In some embodiments, the method may further comprise, prior to (b), receiving a signal from the at least one sensor, which signal may be indicative of the degree of tile or change thereof of the vehicle body.

In some embodiments, the at least two auxiliary support members may be coupled to separate sides of the vehicle body. In some embodiments, the at least two auxiliary support members may be coupled to opposite sides of the vehicle body. In some embodiments, the at least two auxiliary support members may be oppositely oriented with respect to the longitudinal axis.

In some embodiments, at least one of the at least two auxiliary support members may include an auxiliary wheel that is configured to contact the support surface. In some embodiments, each of the at least two auxiliary support members may include an auxiliary wheel that is configured to contact the support surface. In some embodiments, the auxiliary wheels may be steerable.

In some embodiments, the at least one sensor may include a gyroscope that measures a degree of tilt or change thereof of the vehicle body with respect to the gravitational acceleration vector. In some embodiments, the vehicle may further comprise a proximity sensor that detects proximity to the support surface and a stress sensor that detects stress on the at least one of the at least two auxiliary support members. In some embodiments, the method may further comprise, prior to (b), combining data from the proximity sensor and the stress sensor to determine a speed of elongation of the at least one of the at least two auxiliary support members with respect to the vehicle body. In some embodiments, the method may further comprise, prior to (b), combining data from the proximity sensor and the stress sensor to determine a state of stability of the vehicle with respect to the support surface. In some embodiments, the at least one sensor may be integrated with the at least one of the at least two auxiliary support members.

In some embodiments, the directing may comprise directing at least one of the at least two auxiliary support members to extend away from the vehicle body when the degree of tilt of the vehicle body with respect to the gravitational acceleration vector exceeds a predetermined threshold. In some embodiments, the predetermined threshold may be 30 degrees. In some embodiments, the degree of tilt may include a degree of tilt change with time.

It shall be understood that different aspects of the invention can be appreciated individually, collectively, or in combination with each other. Various aspects of the invention described herein may be applied to any of the particular applications set forth below or for any other types of movable objects. Any description herein of two-wheeled vehicles may apply to and be used for vehicle having one wheel, three wheels, four wheels or even more wheels. For instance, any description herein of two-wheeled vehicles may apply to and be used for vehicle having a narrow track width.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
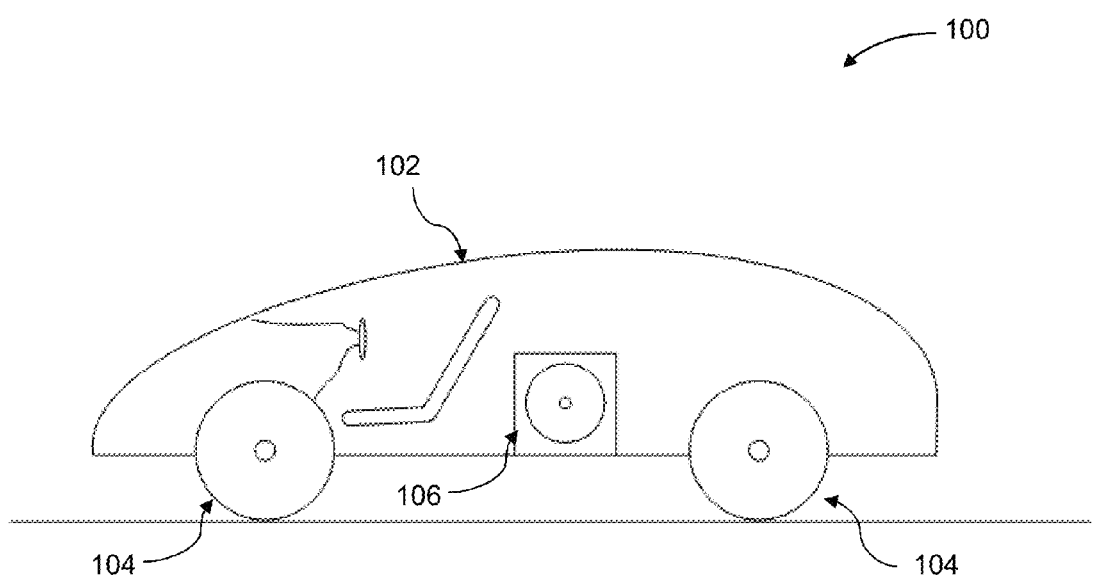
FIG. 1 schematically illustrates an example of a two-wheeled self-balancing vehicle having a control moment gyroscope (CMG) as the balancing member, in accordance with some embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "vehicle," as used herein, generally refers to any machine that is capable of transporting objects from one point to another. A vehicle may be used in various settings, such as commercial, personal or recreational settings. The vehicle can include a form of locomotion, such as an engine (e.g., internal combustion, compressed gas, or electric motor), which may allow displacement or translation of the vehicle from one point to another. The form of locomotion may include a power source to provide the required kinetic energy, in addition to features that enable the vehicle to control motion, such as a braking and steering system. Examples of vehicles include two, three and four-wheeled vehicles.

The term "self-balancing," as used herein, generally refers to balancing with little, minimum or no effort by a user of a vehicle. A self-balancing vehicle can maintain its balance with respect to a support surface with little, minimum or no effort by the user.

The present disclosure provides systems and methods that can provide an effective approach for providing stability to vehicles, such as self-balancing vehicles (e.g., two-wheeled vehicles). In some examples, such stability is provided using at least two auxiliary support members on one or more sides of the vehicle, such as lateral sides of the vehicle. If the balancing member of self-balancing two-wheeled vehicles is in a mechanical fault state or a non-operational state, the auxiliary support members may extend away from the vehicle body to approach and/or touch a support surface (e.g., the ground) and provide stability. In some cases, the auxiliary support members provide additional centripetal force to facilitate steering of the vehicle. The auxiliary support members may be useful when the self-balancing vehicles are stationary by extending to support the vehicle. The auxiliary support members may retract towards the vehicle after the balancing member recovers or the vehicle is restored to a normal orientation under which the vehicle is capable of self-balancing without the aid of the auxiliary support members.

The systems and methods described herein can also contribute to auxiliary stability to traditional two-wheeled vehicles, such as a motorcycle or bicycle, by providing at least two auxiliary support members on lateral sides of the vehicle. The auxiliary support members may extend to touch ground if a degree of tilt of the vehicle with respect to the gravitational acceleration vector exceeds a predetermined threshold. The auxiliary support members may retract towards the vehicle after the vehicle is restored to a normal orientation (e.g., the vehicle is upright).

Advantageously, the systems and methods disclosed herein can enable two-wheeled vehicles, including self-balancing two-wheeled vehicles and traditional two-wheeled vehicles, to receive auxiliary support when a risk of a turn or flip-over is detected, thereby improving safety of two-wheeled vehicles.

In some embodiments, the vehicle may be a two-wheeled vehicle or a vehicle having any number of wheels. The wheel or wheels of the vehicle may be capable of rotating to move the vehicle about freely. The wheels may support the vehicle body against a support surface (e.g., a ground) on which the vehicle moves. In some embodiments, the wheels may be disposed on the vehicle along a longitudinal axial of the vehicle. For instance, for a two-wheeled vehicle, the two wheels can be aligned substantially along the longitudinal axial of the vehicle. In some embodiments, the wheels may be disposed on the vehicle on a symmetrical manner. For instance, for a four-wheeled vehicle, the four wheels can be disposed substantially symmetrical with respect to a center of the vehicle at or near four corners of the vehicle. Alternatively, the plurality of wheels may be disposed on the vehicle in various shapes or configurations. For instance, for a three-wheeled vehicle, the three wheels can be disposed substantially in a formal of triangle.

In some embodiments, the plurality of wheels may be driven independently from each other. For instance, each wheel of the plurality may be driven by a separate motor and may be independently steerable. Alternatively, two or more wheels may be operatively coupled to one another such that they are driven together. For instance, two wheels may be operatively coupled to one another via a shaft such that they are driven by a same motor and steerable concertedly.

The vehicle can be powered by any suitable number and combination of motors that provide translational motion to the vehicle. In some embodiments, the vehicle may include only one motor. In other embodiments, the vehicle may include a plurality of motors, such as two, three, four, five, or more motors. The motors can be arranged on the vehicle as desired. For example, a motor can be situated within the interior of the vehicle (e.g., within an internal cavity of the vehicle and/or attached to an internal surface of the vehicle) or on the exterior of the vehicle (e.g., on an external surface of the vehicle, such as on a top, bottom, front, back, or side surface). In some embodiments, the motor may be provided within a housing of the vehicle. Alternatively, the motor may be provided outside a housing of the vehicle.

The motor may be powered by various energy sources. In some embodiments, the motor may be an internal combustion engine which converts fossil fuel (e.g., gasoline) into motion. Alternatively, the motor may be an electric motor which coverts electricity into motion. Alternatively, the motor may be a hybrid motor, which may be powered by two or more energy sources. For instance, the motor may generate power from both fossil fuel and electricity.

Each motor may drive at least one wheel of the vehicle. For instance, one motor may be operatively coupled to one wheel of the vehicle. Alternatively, one motor may be operatively coupled to more than one wheel of the vehicle. For instance, one motor may drive at least two wheels via a common shaft and/or a transmission mechanism.

In some embodiments, the vehicle may be an electric vehicle powered by battery or battery assemblies. The battery assemblies of the present disclosure can be electrically coupled to at least a part of the vehicle, e.g., via electrical connectors such as wires, cables, pins, contacts, and the like. In some embodiments, the battery assembly is removably coupled to the vehicle, such that the battery can be removed from the vehicle, e.g., for charging, replacement, maintenance, etc. As an alternative, the battery assembly may be permanently affixed to the vehicle and cannot be removed from the vehicle. The battery or battery assemblies may power electric components onboard the vehicle, including but not limited to motor(s), controller(s), sensor(s), steering system, braking system, navigation system, entertainment system, safety system, etc.

In some embodiments, the battery assembly may comprise a plurality of battery cells. The plurality of battery cells may be electrically connected in series or in parallel. Alternatively, the battery assembly may comprise only a single battery cell. The battery cell(s) of a battery assembly can be contained within a housing of the battery assembly, such that the battery assembly is provided as a single unitary device, thereby facilitating handling of the battery assembly. The battery assembly may be any type of suitable battery assembly which is adapted to be mounted on or within the object in order to supply power to one or more electrical components of the object. In some embodiments, the battery assembly is a non-rechargeable battery or primary battery. In other embodiments, the battery assembly may be a rechargeable battery or secondary battery.

FIG. 1 schematically illustrates an example of a two-wheeled self-balancing vehicle 100 having a control moment gyroscope (CMG) as the balancing member. The two-wheeled self-balancing vehicle 100 may include a vehicle body 102 having a longitudinal axis, two wheels 104 which are aligned substantially along the longitudinal axis, each of the at least two wheels being configured to support the vehicle body against a support surface (e.g., ground on which the vehicle moves on), and a CMG 106 coupled to the vehicle body.

The gyroscope can be used in engineering design due to two properties: rigidity and precession. Rigidity can be an important characteristic of gyroscopes where a spinning gyroscope will maintain its orientation in space. This property is utilized in at least some sensor applications, such as navigation systems and passive stabilization systems used in torpedoes or ships. The gyroscope can also be used as an actuator by utilizing the precession phenomenon. CMG systems may use conservation of angular momentum to stabilize unstable bodies (e.g., vehicle bodies) by functioning as an actuator using the phenomenon of gyroscopic precession. When a flywheel is spinning about the ω axis, if an external disturbance is applied about the θ axis (e.g. a bump in the road) and if it has sufficient angular momentum, it will stay horizontal and begin to spin around the α axis (the ω axis, θ axis and α axis being orthogonal to one another). This spin about α axis can be called precession.

In some embodiments, the CMG 106 may include a flywheel, a gimbal frame, a motor, and a gimbaling mechanism. The rotating velocity of the flywheel may be constant. Stability about a longitudinal axis (e.g., the roll axis of the vehicle) of the vehicle body may be achieved and adjusted from the rotating flywheel by adjusting a tilting angle of the gimbal frame with respect to the vehicle floor about the gimbal axis. The flywheel of the CMG may spin about a first axis with the aid of a spinning motor. The spinning flywheel may generate a large and constant angular momentum. The direction of the angular momentum vector can be changed by rotating the flywheel in a about a second axis (e.g., a gimbal axis) by a gimbal motor. A gyroscopic precession torque can be produced about a third axis (e.g., roll axis of the vehicle), which orthogonal to both the first and second axes. The direction of the gyroscopic precession torque may be determined on gimbal motion.

In some embodiments, the CMG 106 in a single-axis gimbal frame may be mounted on the vehicle so that the spin axis of the flywheel is upright (vertical) and the gimbal axis is substantially parallel to the wheel axes of the vehicle. Gimbal control torque can be applied to the gimbal axis, so the resulting precession axis can be parallel to the vehicle's lean axis (e.g., the roll axis of the vehicle). Alternatively, the gyroscope 106 in a single-axis gimbal frame may be mounted on the vehicle so that the spin axis of the flywheel is parallel to the wheel axes of the vehicle and the gimbal axis is upright (vertical). Gimbal control torque can be applied to the gimbal axis, so the resulting precession axis can be parallel to the vehicle's lean axis (e.g., roll axis of the vehicle).

In some embodiments, one CMG may be coupled to the vehicle body. The CMG may be disposed at various locations within the vehicle. In some instances, the CMG may be disposed on a floor of the vehicle. Alternatively, the CMG may be disposed on a roof of the vehicle. Alternatively, CMG may be disposed on a sidewall of the vehicle. In some instances, the CMG may be centered on a longitudinal axis of the vehicle. Alternatively, the CMG may be disposed offset a longitudinal axis of the vehicle. Alternatively, a plurality of CMGs may be provided on the vehicle. For instance, two CMGs may be provided on the vehicle. The plurality of CMGs may be disposed at various locations within the vehicle and operate individually or collectively. In some instances, at least two CMGs in the plurality may be adjacent to one another along a longitudinal axis of the vehicle. Alternatively, at least two CMGs in the plurality may be adjacent to one another along a wheel axis of the vehicle which is substantially orthogonal to the longitudinal axis of the vehicle. Alternatively, no two CMGs in the plurality may be adjacent to one another along the wheel axis or the longitudinal axis of the vehicle. In some embodiments, two CMGs in the plurality may include mass that rotate in opposite directions.

In some embodiments, the CMG may include an Inertia Measurement Unit (IMU) to detect the roll tilt angle of the vehicle. The detected roll tilt angle of the vehicle may be fed to an onboard controller that in turn instructs the CMG's gimbal motor to rotate so that a gyroscopic precession torque is produced to balance the vehicle upright. Alternatively, an IMU may be disposed on the vehicle body to detect the roll tilt angle of the vehicle, and the detected roll tilt angle of the vehicle may be fed to the onboard controller to instruct the CMG's gimbal motor.

The response time of the CMG may be short. The response time of the CMG may be less than or equal to 2.0 sec, 1.0 sec, 0.8 sec, 0.6 sec, 0.4 sec, 0.2 sec, 0.1 sec, 80.0 msec, 60.0 msec, 40.0 msec, 20.0 msec, 10.0 msec, 5.0 msec, 2.0 msec, 1.0 msec, 0.5 msec, 0.1 msec, 0.05 msec or 0.01 msec. Alternatively, the response time of the CMG may be greater than or equal to 0.01 msec, 0.05 msec, 0.1 msec, 0.5 msec, 1.0 msec, 2.0 msec, 5.0 msec, 10.0 msec, 20.0 msec, 40.0 msec, 60.0 msec, 80.0 msec, 0.1 sec, 0.2 sec, 0.4 sec, 0.6 sec, 0.8 sec, 1.0 sec or 2.0 sec. The response time of the CMG may fall within a range between any two of the values described herein. In some embodiments, the response time of the CMG may be 0.1 msec.

The flywheel angular rotating velocity of the CMG may be constant and high. The flywheel angular rotating velocity of the CMG may be greater than or equal to 1000 rpm (revolutions per minute), 1500 rpm, 2000 rpm, 2500 rpm, 3000 rpm, 3500 rpm, 4000 rpm, 4500 rpm, 5000 rpm, 5500 rpm, 6000 rpm, 6500 rpm, 7000 rpm, 7500 rpm, 8000 rpm, 8500 rpm or 9000 rpm. Alternatively, the flywheel angular rotating velocity of the CMG may be less than or equal to 9000 rpm, 8500 rpm, 8000 rpm, 7500 rpm, 7000 rpm, 6500 rpm, 6000 rpm, 5500 rpm, 5000 rpm, 4500 rpm, 4000 rpm, 3500 rpm, 3000 rpm, 2500 rpm, 2000 rpm, 1500 rpm or 1000 rpm. The flywheel angular rotating velocity of the CMG may fall within a range between any two of the values described herein. In some embodiments, the flywheel angular rotating velocity of the CMG may be 5000 rpm.

The mass of the flywheel of the CMG may be large. The mass of the flywheel of the CMG may be greater than or equal to 1 kg, 5 kg, 10 kg, 15 kg, 20 kg, 25 kg, 30 kg, 35 kg, 40 kg, 45 kg, 50 kg, 55 kg, 60 kg, 65 kg, 70 kg, 75 kg, 80 kg, 85 kg, 90 kg, 100 kg, 150 kg, 200 kg, 250 kg or 300 kg. Alternatively, the mass of the flywheel of the CMG may be less than or equal to 300 kg, 250 kg, 200 kg, 150 kg, 100 kg, 90 kg, 85 kg, 80 kg, 75 kg, 70 kg, 65 kg, 60 kg, 55 kg, 50 kg, 45 kg, 40 kg, 35 kg, 30 kg, 25 kg, 20 kg, 15 kg, 10 kg, 5 kg or 1 kg. The mass of the flywheel of the CMG may fall within a range between any two of the values described herein. In some embodiments, the mass of the flywheel of the CMG may be 50 kg.

A gimbal angle of the flywheel of the CMG 106 with respect to the vehicle body plane may be limited to a predetermined angle range. The gimbal angle of the flywheel of the CMG may be the angle between the flywheel rotating plane and the vehicle body plane. The gimbal angle of the flywheel of the CMG may be less than or equal to ±60 degrees, ±55 degrees, ±50 degrees, ±45 degrees, ±40 degrees, ±35 degrees, ±30 degrees, ±25 degrees, ±20 degrees, ±15 degrees or ±10 degrees, with respect to the vehicle body plane. In some embodiments, the gimbal angle of the flywheel of the CMG may not exceed ±45 degrees. In some embodiments, the gimbal angle of the flywheel of the CMG may be measured by an angle sensor disposed on the gimbal axis (e.g., the rotating axis) of the flywheel of the CMG. The angle sensor may be an angle encoder, a photo-electric encoder or a potentiometer. Alternatively, the gimbal angle of the flywheel of the CMG may be measured by a gyroscope disposed on the flywheel of the CMG. Alternatively, the gimbal angle of the flywheel of the CMG may be measured by linear Hall sensors disposed in the gimbal motor. A controller onboard the vehicle may detect that the CMG fails (e.g., in a non-operational state, in which the CMG is not capable of providing stability to vehicle body or stops to operate) if the gimbal angle of the flywheel of the CMG with respect to the vehicle body plane reaches the predetermined angle range. In some embodiments, the controller onboard the vehicle may detect that the CMG fails if the gimbal angle of the flywheel of the CMG with respect to the vehicle body plane reaches 80% of a predetermined angle range.

Figure 2:
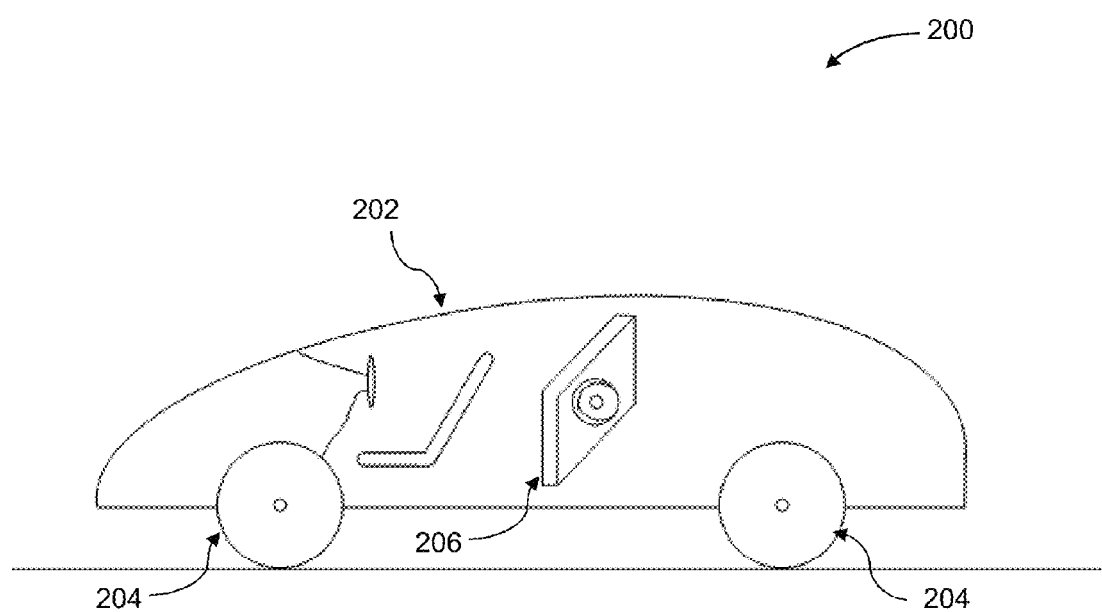
FIG. 2 schematically illustrates an example of a two-wheeled self-balancing vehicle having a flywheel as the balancing member, in accordance with some embodiments of the present disclosure.

FIG. 2 is a schematic showing an example of a two-wheeled self-balancing vehicle 200 having a flywheel as the balancing member. The two-wheeled self-balancing vehicle 200 may include a vehicle body 202 having a longitudinal axis, two wheels 204 which are aligned substantially along the longitudinal axis, each of the at least two wheels being configured to support the vehicle body against a support surface (e.g., ground on which the vehicle moves on), and a flywheel 206 coupled to the vehicle body.

The flywheel 206 may include a flywheel, a frame and a spin motor. The rotating velocity of the flywheel may be variable. Stability about a longitudinal axis (e.g., the roll axis of the vehicle) of the vehicle body may be achieved and adjusted from the rotating flywheel by varying a spinning direction of the flywheel. For instance, if the vehicle body tilts to one side with respect to the longitudinal axis of the vehicle body, the flywheel may spin to the same side and a counterforce generated by the spinning flywheel may balance the vehicle body upright. The flywheel may be mounted on the vehicle so that the spin axis of the flywheel is substantially parallel to the longitudinal axis of the vehicle body.

In some embodiments, one flywheel may be coupled to the vehicle body. The flywheel may be disposed at various locations within the vehicle. Alternatively, a plurality of flywheels may be provided on the vehicle. In some embodiments, the flywheel may include an Inertia Measurement Unit (IMU) to detect the roll tilt angle of the vehicle. The detected roll tilt angle of the vehicle may be fed to an onboard controller that in turn instructs the flywheel's spin motor to rotate in a corresponding direction so that a counterforce is produced to balance the vehicle upright. Alternatively, an IMU may be disposed on the vehicle body to detect the roll tilt angle of the vehicle, and the detected roll tilt angle of the vehicle may be fed to the onboard controller to instruct the spinning direction of the flywheel's spin motor.

The mass of the flywheel may be large. The mass of the flywheel may be greater than or equal to 1 kg, 5 kg, 10 kg, 15 kg, 20 kg, 25 kg, 30 kg, 35 kg, 40 kg, 45 kg, 50 kg, 55 kg, 60 kg, 65 kg, 70 kg, 75 kg, 80 kg, 85 kg, 90 kg, 100 kg, 150 kg, 200 kg, 250 kg or 300 kg. Alternatively, the mass of the flywheel may be less than or equal to 300 kg, 250 kg, 200 kg, 150 kg, 100 kg, 90 kg, 85 kg, 80 kg, 75 kg, 70 kg, 65 kg, 60 kg, 55 kg, 50 kg, 45 kg, 40 kg, 35 kg, 30 kg, 25 kg, 20 kg, 15 kg, 10 kg, 5 kg or 1 kg. The mass of the flywheel may fall within a range between any two of the values described herein. In some embodiments, the mass of the flywheel may be 50 kg.

The angular rotating velocity of the flywheel may be variable and high. An upper limit of the angular rotating velocity of the flywheel may be less than or equal to 9000 rpm, 8500 rpm, 8000 rpm, 7500 rpm, 7000 rpm, 6500 rpm, 6000 rpm, 5500 rpm, 5000 rpm, 4500 rpm, 4000 rpm, 3500 rpm, 3000 rpm, 2500 rpm, 2000 rpm, 1500 rpm or 1000 rpm. The angular rotating velocity of the flywheel may fall within a range between any two of the values described herein. In some embodiments, the angular rotating velocity of the flywheel may not exceed 5000 rpm. The angular rotating velocity of the flywheel may be measured by an angular velocity meter disposed on the spin axis of the spin motor. A controller onboard the vehicle may detect that the flywheel fails (e.g., in a non-operational state, in which the flywheel is not capable of providing stability to vehicle body or stops to operate) if the angular rotating velocity of the flywheel reaches the upper limit. In some embodiments, the controller onboard the vehicle may detect that the flywheel fails if the angular rotating velocity of the flywheel reaches 80% of the upper limit of the angular rotating velocity of the flywheel. For instance, the angular rotating velocity of the flywheel may be at least 5000 rpm, and the controller onboard the vehicle may detect that the flywheel fails if the angular rotating velocity of the flywheel reaches 4000 rpm.

Figure 3:
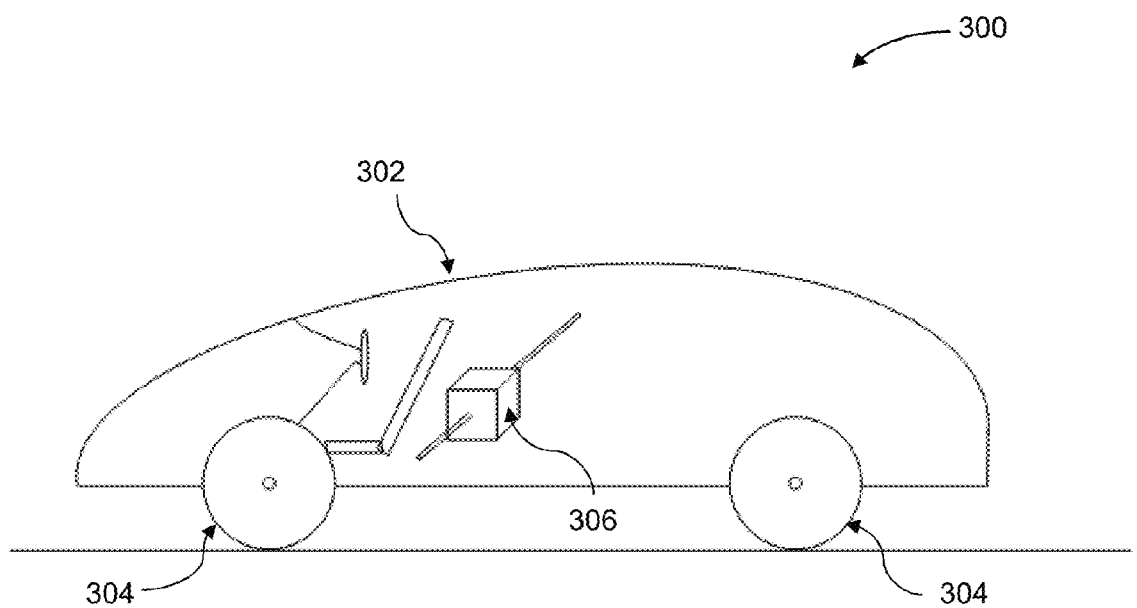
FIG. 3 schematically illustrates an example of a two-wheeled self-balancing vehicle having a shifting weight as the balancing member, in accordance with some embodiments of the present disclosure.

FIG. 3 schematically illustrates an example of a two-wheeled self-balancing vehicle 300 having a shifting weight as the balancing member. The two-wheeled self-balancing vehicle 300 may include a vehicle body 302 having a longitudinal axis, two wheels 304 which are aligned substantially along the longitudinal axis, each of the at least two wheels being configured to support the vehicle body against a support surface (e.g., ground on which the vehicle moves on), and a shifting weight 306 coupled to the vehicle body.

The shifting weight 306 may include a sliding rod, a mass slidably sleeved on the sliding rod such that the mass can move along the sliding rod and a frame on which the sliding rod is fixed. In some embodiments, the shifting weight 306 may be mounted on the vehicle so that the extending direction of the sliding rod is substantially parallel to the wheel axes of the vehicle (e.g., substantially orthogonal to the longitudinal axis of the vehicle). The mass of the shifting weight 306 can slide along the sliding rod to compensate a leaning of the vehicle about the vehicle's lean axis (e.g., roll axis of the vehicle). For instance, if the vehicle leans towards left direction about the vehicle's lean axis, the mass may slide towards the opposite direction (e.g., right direction) along the sliding rod so that the vehicle is kept upright.

In some embodiments, one shifting weight may be coupled to the vehicle body. The shifting weight may be disposed at various locations within the vehicle. In some instances, the shifting weight may be disposed on a floor of the vehicle. Alternatively, the shifting weight may be disposed on a roof of the vehicle. Alternatively, shifting weight may be disposed on a sidewall of the vehicle. In some instances, the shifting weight may be centered on a longitudinal axis of the vehicle. Alternatively, the shifting weight may be disposed offset a longitudinal axis of the vehicle. Alternatively, a plurality of shifting weights may be provided on the vehicle. For instance, two shifting weights may be provided on the vehicle. The plurality of shifting weights may be disposed at various locations within the vehicle and operate individually or collectively. In some instances, at least two shifting weights in the plurality may be adjacent to one another along a longitudinal axis of the vehicle. Alternatively, at least two shifting weights in the plurality may be adjacent to one another along a wheel axis of the vehicle which is substantially orthogonal to the longitudinal axis. Alternatively, no two shifting weights in the plurality may be adjacent to one another along the wheel axis or the longitudinal axis of the vehicle.

In some embodiments, the shifting weight may include an Inertia Measurement Unit (IMU) to detect the roll tilt angle of the vehicle. The detected roll tilt angle of the vehicle may be fed to an onboard controller that in turn instructs the mass of the shifting weight to slide towards an opposite direction of the vehicle's roll tilt so that the vehicle is balanced upright. Alternatively, an IMU may be disposed on the vehicle body to detect the roll tilt angle of the vehicle, and the detected roll tilt angle of the vehicle may be fed to the onboard controller to instruct the shifting direction of the mass of the shifting weight.

The response time of the shifting weight may be short. The response time of the shifting weight may be less than or equal to 2.0 sec, 1.0 sec, 0.8 sec, 0.6 sec, 0.4 sec, 0.2 sec, 0.1 sec, 80.0 msec, 60.0 msec, 40.0 msec, 20.0 msec, 10.0 msec, 5.0 msec, 2.0 msec, 1.0 msec, 0.5 msec, 0.1 msec, 0.05 msec or 0.01 msec. Alternatively, the response time of the shifting weight may be greater than or equal to 0.01 msec, 0.05 msec, 0.1 msec, 0.5 msec, 1.0 msec, 2.0 msec, 5.0 msec, 10.0 msec, 20.0 msec, 40.0 msec, 60.0 msec, 80.0 msec, 0.1 sec, 0.2 sec, 0.4 sec, 0.6 sec, 0.8 sec, 1.0 sec or 2.0 sec. The response time of the shifting weight may fall within a range between any two of the values described herein. In some embodiments, the response time of the shifting weight may be 0.1 msec.

The weight of the mass of the shifting weight may be large. The weight of the mass of the shifting weight may be greater than or equal to 1 kg, 5 kg, 10 kg, 15 kg, 20 kg, 25 kg, 30 kg, 35 kg, 40 kg, 45 kg, 50 kg, 55 kg, 60 kg, 65 kg, 70 kg, 75 kg, 80 kg, 85 kg, 90 kg, 100 kg, 150 kg, 200 kg, 250 kg or 300 kg. Alternatively, the weight of the mass of the shifting weight may be less than or equal to 300 kg, 250 kg, 200 kg, 150 kg, 100 kg, 90 kg, 85 kg, 80 kg, 75 kg, 70 kg, 65 kg, 60 kg, 55 kg, 50 kg, 45 kg, 40 kg, 35 kg, 30 kg, 25 kg, 20 kg, 15 kg, 10 kg, 5 kg or 1 kg. The weight of the mass of the shifting weight may fall within a range between any two of the values described herein. In some embodiments, the weight of the mass of the shifting weight may be 50 kg.

The shifting weight may fail if it reaches an end of the lateral sliding rod on which the mass of the shifting weight slidably sleeved. For instance, if the vehicle is not balanced back even if the mass of the shifting weight reaches the far end of the sliding rod in the opposite direction, the shifting weight may fail to balance the vehicle body. A controller onboard the vehicle may detect that the shifting weight fails (e.g., in a non-operational state, in which the shifting weight is not capable of providing stability to vehicle body or stops to operate) if the mass reaches an end of the lateral sliding rod on which the mass slidably sleeved. In some embodiments, the operating state of the shifting weight may be determined based upon whether a mass of the shifting weight reaches a predetermined position on the sliding rod on which the mass slides. In some examples, the operating state of the shifting weight may be determined as failing if the mass of the shifting weight reaches or exceeds a position that is less than 20% of a total length of the sliding rod to the end of the sliding rod.

In some embodiments, a plurality of balancing members may be provided onboard the vehicle to balance the vehicle body with respect to the support surface. In some instance, the plurality of balancing members is of the same type (e.g., CMG). For instance, more than one CMG, flywheel or shifting weight may be provided onboard the vehicle. The orientation and spatial arrangement of the plurality of same-type balancing members can be arbitrary as long as they collectively balance the vehicle body in one or more dimensions, as discussed elsewhere herein. Alternatively, the individual balancing members of the plurality of balancing members may be of different types. For instance, any combination of CMG(s), flywheel(s) and shifting weight(s) may be provided onboard the vehicle. In some instances, a first balancing member may be adjacent to a second balancing member along a wheel axis that is orthogonal to the longitudinal axis of the vehicle body. Alternatively, a first balancing member may be adjacent to a second balancing member along the longitudinal axis of the vehicle body.

Figure 4A:
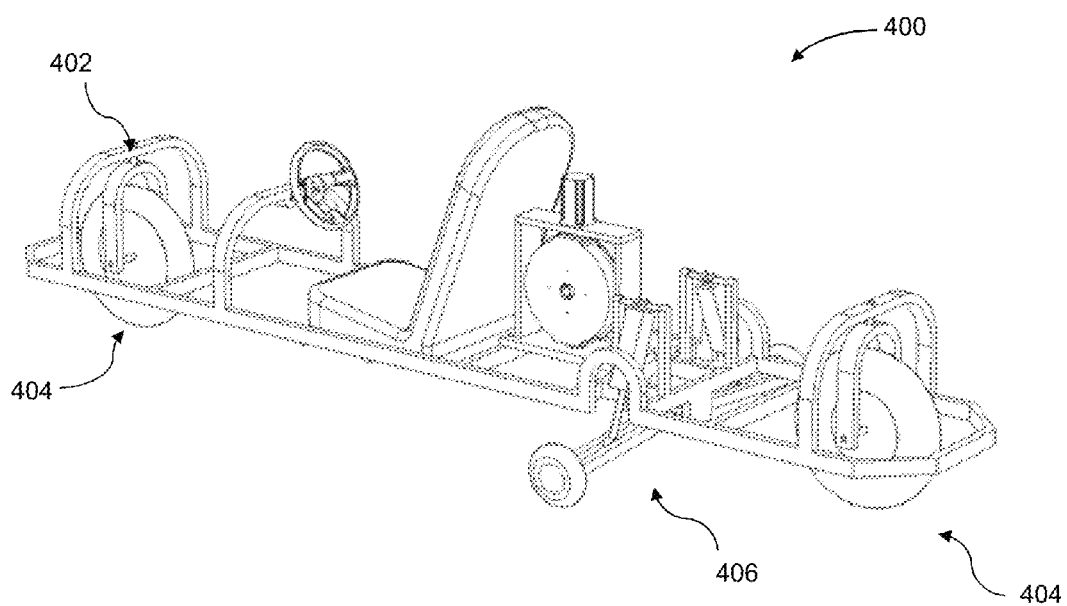
FIGS. 4a-4d illustrate various examples of a two-wheeled self-balancing vehicle having auxiliary support members, in accordance with some embodiments of the present disclosure.
Figure 4B:
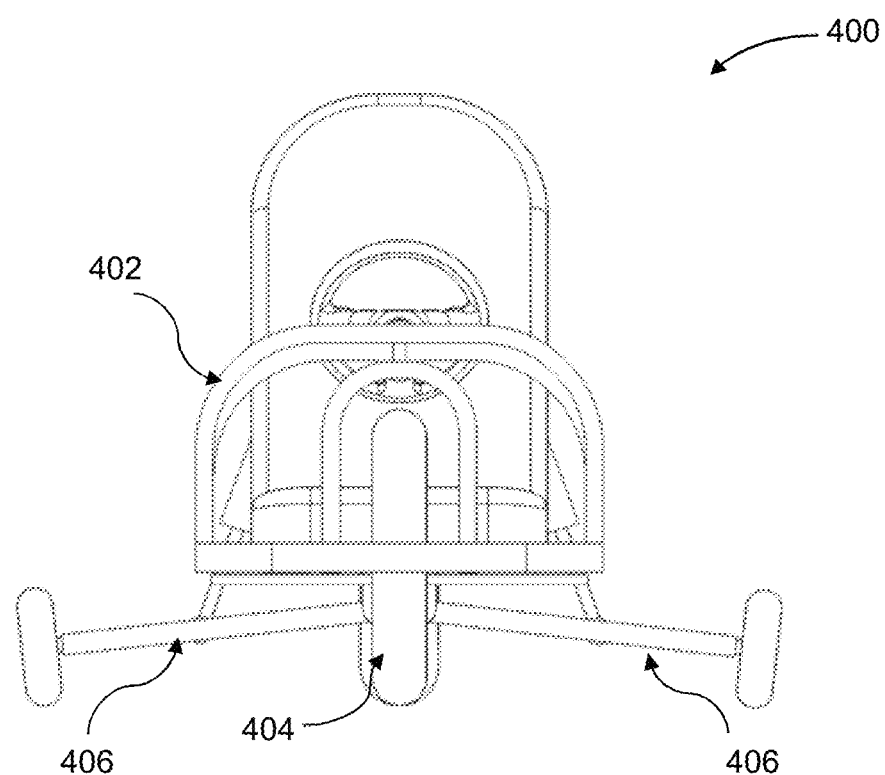
Figure 4C:
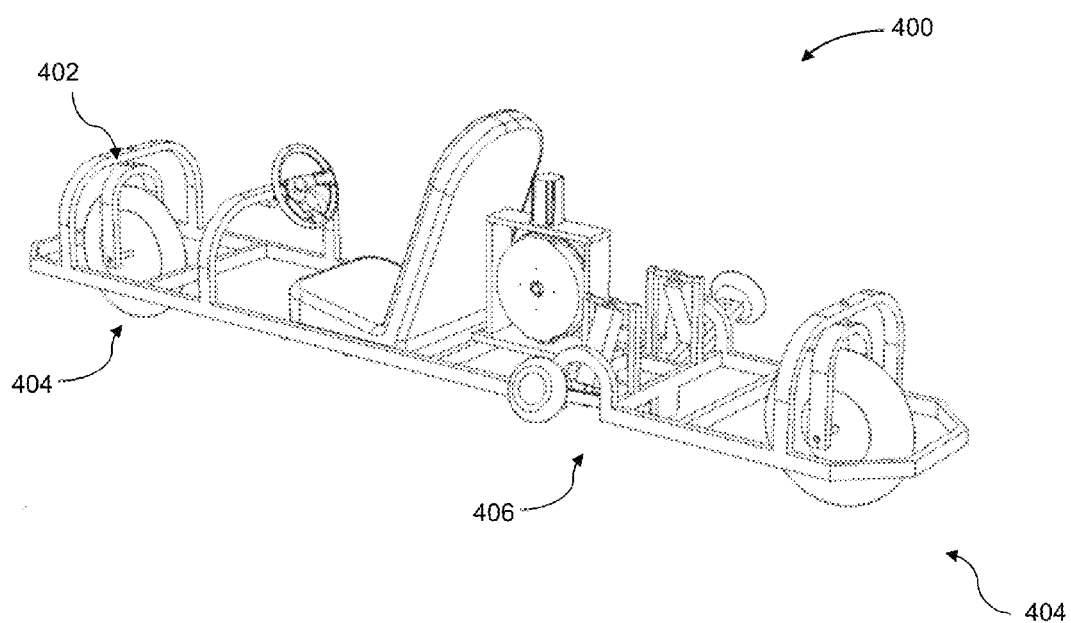
Figure 4D:
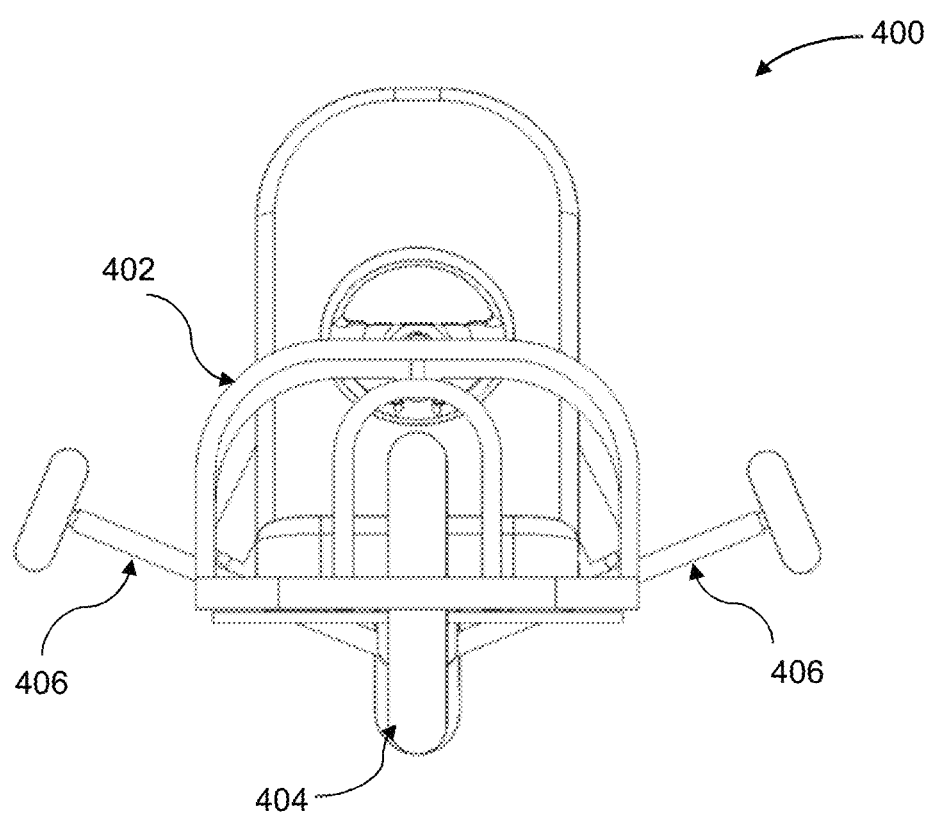

FIG. 4 illustrates an example of a two-wheeled self-balancing vehicle 400 having auxiliary support members, in which FIG. 4a schematically illustrates an example of a two-wheeled self-balancing vehicle 400 having auxiliary support members in an extended state, FIG. 4b illustrates in a cross-sectional view an example of a two-wheeled self-balancing vehicle 400 having auxiliary support members in an extended state, FIG. 4c schematically illustrates an example of a two-wheeled self-balancing vehicle 400 having auxiliary support members in an extracted state, and FIG. 4d illustrates in a cross-sectional view an example of a two-wheeled self-balancing vehicle 400 having auxiliary support members in an extracted state. The two-wheeled self-balancing vehicle 400 may include a vehicle body 402 having a longitudinal axis, two wheels 404 which are aligned substantially along the longitudinal axis, each of the at least two wheels being configured to support the vehicle body against a support surface (e.g., ground on which the vehicle moves on), and at one or more auxiliary support members 406 coupled to the vehicle body.

The auxiliary support member 406 may extend away and/or retract towards the vehicle body 402. As shown in FIGS. 4a-4b, the auxiliary support member in an extended state may contact the support surface (e.g., ground on which the vehicle is positioned) and provide stability to the vehicle body with respect to the support surface. In some embodiments, the auxiliary support member may extend out from a retracted state when the one or more balancing members (e.g., CMG, flywheel or shifting weight, as discussed elsewhere herein) onboard the self-balancing vehicle is in a faulty state. For instance, the CMG may be mechanically stuck by accident during its operation. Alternatively, the auxiliary support member may extend out from a retracted state when the one or more balancing members onboard the self-balancing vehicle fails. For instance, the CMG may reach a limit of balancing when the vehicle is turning a sharp corner with a high velocity. Alternatively, the auxiliary support member may extend out from a retracted state when the one or more balancing members onboard the self-balancing vehicle is in a non-operational state. For instance, the flywheel may stop spinning when the vehicle is to be stationary for a relatively long period of time in order to decrease a power consumption. The auxiliary support member 406 may not by deployed by extending out from a retracted state when the one or more balancing members onboard the self-balancing vehicle is in a operational state, under which the one or more balancing members may provide sufficient stability to the self-balancing vehicle with respect to the support ground, as shown in FIGS. 4c-4d. Alternatively, the auxiliary support member may extend out from a retracted state based upon a change of an operating state of the one or more balancing members. The operating state of the balancing member may include but not limited to an operational state, a faulty state or a non-operational state. For instance, the auxiliary support member may extend away from the vehicle body if the operating state of the balancing member changes from an operational state to a faulty state or from an operational state to a non-operational state.

The auxiliary support member 406 may be provided on lateral sides (e.g., in a direction substantially perpendicular to the longitudinal axis of the vehicle) of the vehicle body 402. The auxiliary support member may be coupled to the vehicle body at arbitrary position along the longitudinal axis thereof. In some instances, the auxiliary support member may be coupled to the vehicle body at a substantially middle portion thereof. Alternatively, the auxiliary support member may be coupled to the vehicle body at a relatively rear portion thereof. Alternatively, the auxiliary support member may be coupled to the vehicle body at a relatively front portion thereof.

In some embodiments, at least one auxiliary support member 406 may be provided at each one of lateral sides of the vehicle body. Alternatively, one or more auxiliary support members may be provided on only one lateral side of the vehicle body. For instance, one auxiliary support member may be provided on each one of lateral sides of the vehicle body. For another instance, one auxiliary support member may be provide on one of the lateral sides of the vehicle body, and two or more auxiliary support members may be provide on the other one of the lateral sides of the vehicle body. For still another instance, more than one auxiliary support members may be provide on one of the lateral sides of the vehicle body, and more than one auxiliary support members may be provide on the other one of the lateral sides of the vehicle body. For still another instance, one or more auxiliary support members may be provide on one of the lateral sides of the vehicle body, and no auxiliary support member may be provide on the other one of the lateral sides of the vehicle body. If more than one auxiliary support members are provide on one lateral side of the vehicle body, the plurality of auxiliary support members may be spaced from one another with a predetermined distance. For instance, if more than one auxiliary support members are provide on one lateral side of the vehicle body, one of the auxiliary support members may be coupled to the vehicle body at a relatively rear portion thereof, and another one of the auxiliary support members may be coupled to the vehicle body at a relatively front portion thereof.

In case at least one auxiliary support member 406 is provided at each one of lateral sides of the vehicle body, the at least two auxiliary support members may be oppositely oriented with respect to the longitudinal axis of the vehicle body. For instance, if one auxiliary support member is provided on each one of lateral sides of the vehicle body, the two auxiliary support member may be oriented symmetrically with respect to the longitudinal axis of the vehicle body.

If a plurality of auxiliary support member 406 are coupled to the vehicle body, the plurality of auxiliary support member may extend away from and/or retract towards the vehicle body independently from one another. In some instances, if the more than one auxiliary support members are coupled to one lateral side of the vehicle body, the plurality of auxiliary support members may extend away from and/or retract towards the vehicle body independently from one another. For instance, the controller onboard the vehicle may determine a number and sequence of extending out and retracting back the plurality of auxiliary support members based on factors including but not limited to a weight of the vehicle, a velocity of the vehicle, an operational state of the one or more balancing members, a centrifugal force applied to the vehicle, an angle of tile of the vehicle, etc. Alternatively, if at least one auxiliary support member is provided at each one of lateral sides of the vehicle body, the auxiliary support members on opposite lateral sides of the vehicle body may extend away from and/or retract towards the vehicle body independently from one another. For instance, only the one or more auxiliary support members attached to one lateral side of the vehicle body may extend out when the vehicle body is tilting towards the lateral side thereof. Alternatively, the auxiliary support members attached to both lateral sides of the vehicle body may extend out simultaneously when the vehicle body is tilting towards one lateral side thereof. For example, when the vehicle is steering and tilting towards an inner side of the curve path, only the one or more auxiliary support members attached to one lateral side of the vehicle body corresponding to the inner side of the curve path may extend out to provide support and stability to the vehicle body. For another example, when the vehicle is steering and tilting towards an inner side of the curve path, the auxiliary support members attached to both lateral sides of the vehicle body may extend out simultaneously; in this case, the auxiliary support members attached to one lateral side of the vehicle body corresponding to the inner side of the curve path may provide support and stability to the vehicle body, and the auxiliary support members attached to the opposite lateral side may provide additional centripetal force to the vehicle body so as to facilitate the steering.

The extending and retracting of the auxiliary support member 406 may be implemented in various mechanisms. In some embodiments, the auxiliary support member may include a telescopic rod which is retractable away and/or toward the vehicle body. For instance, the telescopic rod may be a hydraulic retractable rod having a hydraulic cylinder or pneumatic cylinder which can provide a long output travel from a very compact retracted length. In some instances, the telescopic rod may be a fluid-driven hydraulic retractable rod, an air-driven hydraulic retractable rod or an electric-driven hydraulic retractable rod. Alternatively, the auxiliary support member may include a foldable rod which is foldable away and/or toward the vehicle body by way of rotating with respect to the vehicle body. In some instance, the foldable rod may be a lever which is pivotally connected to the vehicle body. Alternatively, auxiliary support member may include a combination of a telescopic rod and a foldable rod. Alternatively, the foldable rod may include a plurality of rigid links (e.g., segments) connected to one another by joints.

The auxiliary support members 406 may be connected to separate motors that enable each of the auxiliary support members to individually extend out and retract back. Alternatively, the auxiliary support members may be connected to a common motor through different gears that enable each of the auxiliary support members to individually extend out and retract back.

In some embodiments, the auxiliary support member 406 may be positioned substantially beneath the vehicle body when in a retracted state. Alternatively, the auxiliary support member may be positioned substantially above the vehicle body when in a retracted state. Alternatively, the auxiliary support member may be positioned substantially parallel with the vehicle body when in a retracted state. Alternatively, the auxiliary support member may be positioned with an arbitrary angle with respect to the vehicle body when in a retracted state. In some embodiments, the auxiliary support member may be positioned substantially within a housing of the vehicle body when in a retracted state. Alternatively, the auxiliary support member may be positioned substantially outside a housing of the vehicle body when in a retracted state. For instance, the auxiliary support member may be deployed (e.g., extending away) from an retracted position beneath the vehicle body in case of needed, and retracted back to the retracted position thereafter. For another instance, the auxiliary support member may extend out from within the housing of the vehicle body in case of need, and retracted back within the housing of the vehicle body thereafter.

The response time of the auxiliary support member, which is the time for the auxiliary support member extending out and/or retracting back upon receiving an instruction from a controller, may be short. The response time of the auxiliary support member may be less than or equal to 2.0 sec, 1.0 sec, 0.8 sec, 0.6 sec, 0.4 sec, 0.2 sec, 0.1 sec, 80.0 msec, 60.0 msec, 40.0 msec, 20.0 msec, 10.0 msec, 5.0 msec, 2.0 msec, 1.0 msec, 0.5 msec, 0.1 msec, 0.05 msec or 0.01 msec. Alternatively, the response time of the auxiliary support member may be greater than or equal to 0.01 msec, 0.05 msec, 0.1 msec, 0.5 msec, 1.0 msec, 2.0 msec, 5.0 msec, 10.0 msec, 20.0 msec, 40.0 msec, 60.0 msec, 80.0 msec, 0.1 sec, 0.2 sec, 0.4 sec, 0.6 sec, 0.8 sec, 1.0 sec or 2.0 sec. The response time of the auxiliary support member may fall within a range between any two of the values described herein. In some embodiments, the response time of the auxiliary support member may be 0.5 msec.

The time of extending/retracting the auxiliary support member, which is the time for the auxiliary support member extending out and reaching the support surface and/or retracting back from the support surface upon receiving an instruction from a controller, may be short. The extending/retracting time of the auxiliary support member may be less than or equal to 2.0 sec, 1.0 sec, 0.8 sec, 0.6 sec, 0.4 sec, 0.2 sec, 0.1 sec, 80.0 msec, 60.0 msec, 40.0 msec, 20.0 msec, 10.0 msec, 5.0 msec, 2.0 msec, 1.0 msec, 0.5 msec, 0.1 msec, 0.05 msec or 0.01 msec. Alternatively, the extending/retracting time of the auxiliary support member may be greater than or equal to 0.01 msec, 0.05 msec, 0.1 msec, 0.5 msec, 1.0 msec, 2.0 msec, 5.0 msec, 10.0 msec, 20.0 msec, 40.0 msec, 60.0 msec, 80.0 msec, 0.1 sec, 0.2 sec, 0.4 sec, 0.6 sec, 0.8 sec, 1.0 sec or 2.0 sec. The extending/retracting time of the auxiliary support member may fall within a range between any two of the values described herein. In some embodiments, the extending/retracting time of the auxiliary support member may be 0.5 msec.

In some embodiments, the auxiliary support member 406 may include one or more auxiliary rotatable members at a distal end thereof that is configured to contact the support surface when the auxiliary support member is extended way from the vehicle body to contact the support surface and provide stability to the vehicle body. In some instances, the auxiliary rotatable member may be auxiliary wheel that is configured to contact the support surface. Alternatively, the auxiliary rotatable members may be auxiliary track that is configured to contact the support surface. The one or more auxiliary wheels or auxiliary tracks may be rotatable with respect to the support surface such as the ground. In some instances, if more than one auxiliary support members are coupled to the vehicle body, at least one of the auxiliary support members may include the one or more auxiliary wheels or auxiliary tracks. Alternatively, each one of the plurality of auxiliary support members may include the one or more auxiliary wheels or auxiliary tracks. In some instances, if more than one auxiliary wheel or auxiliary track is provided at the distal end of the auxiliary support member, the auxiliary wheels may be disposed in a line corresponding to the longitudinal axis of the vehicle body or in an array. For instance, the plurality of auxiliary wheels or auxiliary tracks may be coupled to a wheel frame which is pivotally connected to the distal end of the auxiliary support member via a hinge, such that the wheel frame can be rotatable with respect to the auxiliary support member about an axis which is substantially orthogonal to the longitudinal axis of the vehicle body. The number of auxiliary wheels or auxiliary tracks provided at a distal end of one auxiliary support member may be 1, 2, 3, 4, 5, 6, 7, 8, 9 or 10. In some embodiments, one auxiliary wheel or auxiliary tracks may be provided at the distal end of one auxiliary support member. Alternatively, two auxiliary wheels or auxiliary tracks may be provided at the distal end of one auxiliary support member. In some instance, the auxiliary wheel and the auxiliary track may be used in a combination. For instance, one or more auxiliary wheels and one or more auxiliary tracks may be provided at a distal end of the auxiliary support member.

In some embodiments, the auxiliary rotatable member may be steerable with respect to the vehicle body. For instance, the auxiliary wheel and/or the auxiliary track may be pivotally couple to the distal end of the auxiliary rotatable member such that the auxiliary wheel and/or the auxiliary track are capable of rotate about a vertical axis. In case a plurality of auxiliary wheels or auxiliary tracks are coupled to a wheel frame, the wheel frame may be pivotally couple to the distal end of the auxiliary rotatable member such that the wheel frame is capable of rotate about a vertical axis. The rotatable auxiliary rotatable member and/or wheel frame may facilitate the steering of the vehicle when the vehicle is turning direction.

Figure 5:
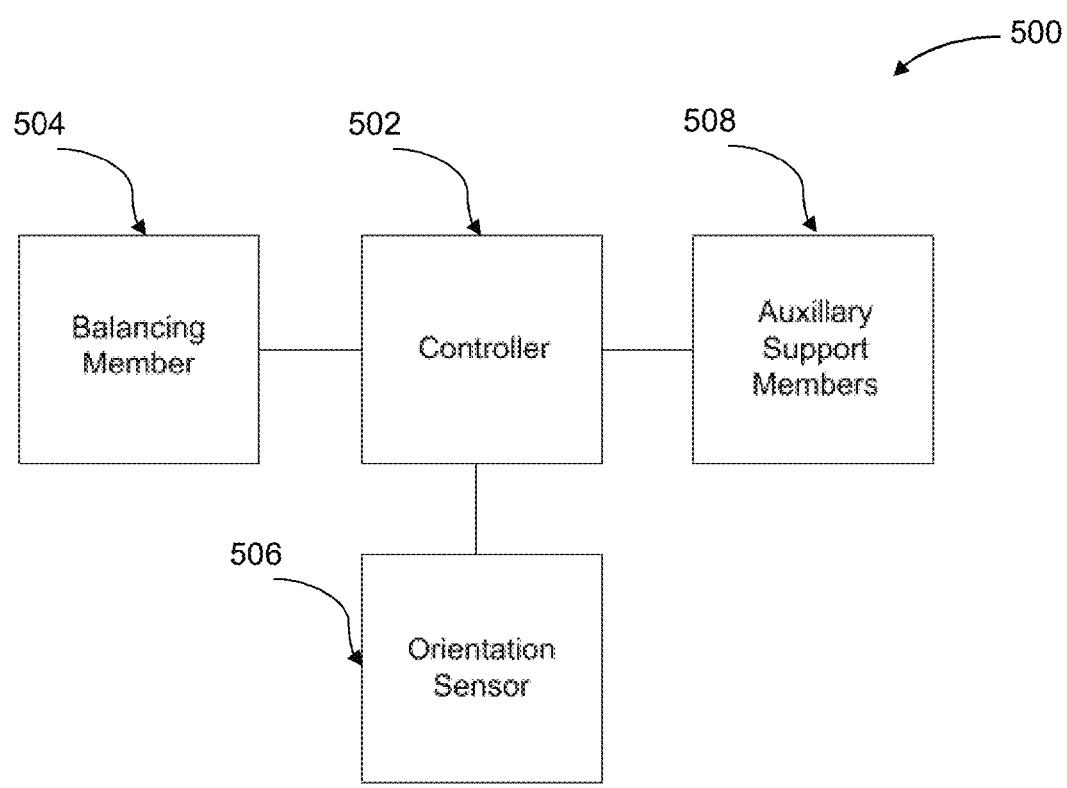
FIG. 5 schematically illustrates an example of a control system for two-wheeled self-balancing vehicles, in accordance with some embodiments of the present disclosure.

FIG. 5 schematically illustrates an example of a control system for two-wheeled self-balancing vehicles, which can be used to regulate auxiliary support members of the two-wheeled self-balancing vehicles. A controller 502 may be in communication with one or more balancing member 504 and one or more auxiliary support members 508. In some embodiments, the controller may also be communication with an orientation sensor 506 which is optional.

The balancing member 504 may facilitate balancing of the vehicle body against the support surface when the one or more auxiliary support members are not in contact with the support surface. The balancing member may be a CMG, a flywheel, a shifting weight or a combination thereof, as discussed elsewhere herein. The balancing member may be capable of output an operating state signal indicative of the operating state thereof, as discussed elsewhere herein. In some embodiments, the operating state of the balancing member may include but not limited to an operational state (e.g., the balancing member can function to balance the vehicle body), a faulty state (e.g., the balancing member may have mechanical or electrical problem and can't operate to balance the vehicle body) or a non-operational state (e.g., the balancing member may reach a limit of balancing the vehicle body or stop to operate). For instance, the operational state may correspond to a state of the balancing member under which the balancing member operates properly, the faulty state may correspond to a state of the balancing member under which the balancing member encounters mechanical or electrical fault and thus fails to function, and the non-operational state may correspond to a state of the balancing member under which the balancing member can't balance the vehicle body although no mechanical or electrical fault occurs. The auxiliary support member may extend away from the vehicle body based upon a change of an operating state of the one or more balancing members, as discussed elsewhere herein.

In some embodiments, an orientation sensor 506 may be additionally provided in communication with the controller. The orientation sensor may be onboard the vehicle to measure an orientation of the vehicle body. In some instances, the orientation sensor may be a gyroscope which measures a tilt angle of the vehicle body with respect to a gravitational acceleration vector. The measured orientation of the vehicle body may be used by the controller to force the one or more auxiliary support members to extend away to touch the support surface and provide stability to the vehicle body when the measured orientation of the vehicle body reaches a predetermined threshold, even if the operating state of the balancing member may indicate an operational state at the current timing. In some instance, the orientation may be an attitude or posture of the vehicle body, such as a tilt angle of the vehicle body with respect to three axes of a global coordinate.

The controller 502 may receive signals from the one or more balancing member and instruct the one or more auxiliary support members to extend away from and/or retract towards the vehicle body based upon the received signal, thereby stabilizing the vehicle body with respect to the support surface. Alternatively, the controller may receive signals from the one or more balancing member and the orientation sensor and instruct the one or more auxiliary support members to extend away from and/or retract towards the vehicle body based upon the received signals. In some embodiments, the controller may comprise one or more computer processors that are individually or collectively programmed to direct the one or more auxiliary support members to extend away from and/or retract towards the vehicle body, based upon an operating state or change thereof of the vehicle which are indicated by the signals received from the one or more balancing member and the orientation sensor. In some instances, the operating state of the vehicle may be selected from the group consisting of (1) an operating state of the one or more balancing members, and (2) an orientation of the vehicle body with respect to a gravitational acceleration vector.

In some instances, the operating state signal outputted from the one or more balancing members may be indicative of a faulty state of the balancing member, which may indicate that the balancing member has encountered or is going to encounter mechanical or electrical fault and thus fails to balance the vehicle body. For instance, the controller may direct the one or more auxiliary support members to extend away from the vehicle body to provide stability to the vehicle body against the support surface when the CMG stops spinning and cannot balance the vehicle body due to a mechanical malfunction.

The operating state signal outputted from the one or more balancing members may be indicative of a non-operational state of the balancing member, which may indicate that the balancing member has reached a limit of balancing the vehicle even though no mechanical or electrical fault has occurred, as discussed herein above. For instance, the controller may direct the one or more auxiliary support members to extend away from the vehicle body to provide stability to the vehicle body against the support surface when the self-balancing vehicle stops for a long period of time (e.g., parking) and the flywheel stops spinning for less electric power consumption.

Alternatively, the operating state signal outputted from the one or more balancing members may be indicative of an operational state of the balancing member, which may indicate that the balancing member is properly operating to balance the vehicle body. For instance, the controller may direct the one or more auxiliary support members to extend away from the vehicle body to provide stability to the vehicle body against the support surface when the balancing member is reaching a limit of balancing the vehicle, even if the balancing member operates properly to balance the vehicle body at the current timing. For another instance, the controller may direct the one or more auxiliary support members to extend away from the vehicle body in a forcible manner to provide stability to the vehicle body against the support surface when the orientation of the vehicle body (e.g., a tilt angle of the vehicle body with respect to a gravitational acceleration vector) reaches a predetermined threshold (e.g., 30 degrees), even if the balancing member is in an operational state (e.g., not reaching the limit of balancing the vehicle).

In some embodiments, the auxiliary support member may extend out before the balancing member reaches the limit of balancing the vehicle or before the orientation of the vehicle body reaches the predetermined threshold. Alternatively, the auxiliary support member may extend out upon the balancing member reaches the limit of balancing the vehicle or upon the orientation of the vehicle body reaches the predetermined threshold. Alternatively, the auxiliary support member may extend out after the balancing member reaches the limit of balancing the vehicle or after the orientation of the vehicle body reaches the predetermined threshold. For instance, the auxiliary support member may extend out from the vehicle body immediate after the after the balancing member reaches the limit of balancing the vehicle and provide stability to the vehicle body before the vehicle body tilts to a dangerous angle, since the extending time of the auxiliary support member is short in a millisecond scale (e.g., 0.5 msec) as discussed herein above.

In some embodiments, the controller may direct the auxiliary support member to retract back towards the vehicle body from the extended state after the vehicle body is restored to a position under which the vehicle body is capable of self-balancing with the aid of the balancing member or the orientation of the vehicle body is away from the predetermined threshold towards a neutral orientation. The retracted auxiliary support member may lower a wind resistance and a volume of the vehicle body. The retracting time of the auxiliary support member may be short in a millisecond scale (e.g., 0.5 msec), as discussed herein above.

In some embodiments, the controller may direct the plurality of auxiliary support members to extend at substantially the same length from the vehicle body. For instance, in case one support member is coupled to each one of the lateral sides of the vehicle body which is driving on a horizontal surface, the controller may direct the two auxiliary support members to extend at substantially the same length from the vehicle body, such that the orientation of the vehicle body is restored to a neutral orientation from a tilted orientation. For another instance, in case more than one auxiliary support member is coupled to each one of the lateral sides of the vehicle body, the controller may direct the auxiliary support members on one same lateral side of the vehicle body to extend at substantially the same length from the vehicle body, such that the more than one auxiliary support member may collectively provide stability to the vehicle body. In some instances, when extended at substantially the same length from the vehicle body, the plurality of auxiliary support members may be coplanar with the at least two wheels of the vehicle. For instance, in case one support member is coupled to each one of the lateral sides of the vehicle body of a two-wheeled self-balancing vehicle, the extended two auxiliary support members at substantially the same length from the vehicle body may be coplanar with the two wheels of the two-wheeled self-balancing vehicle, such that the orientation of the vehicle body maintained at a neutral orientation. Alternatively, when extended at substantially the same length from the vehicle body, at least one of the plurality of auxiliary support members may be coplanar with the at least two wheels of the vehicle. For instance, in case one support member is coupled to each one of the lateral sides of the vehicle body of a two-wheeled self-balancing vehicle and the vehicle body is tilting while steering, out of the extended plurality auxiliary support members at substantially the same length, at least the auxiliary support member disposed at the inner side of the curve path may be coplanar with the two wheels of the two-wheeled self-balancing vehicle, such that the auxiliary support member at the inner side can provide stability to the vehicle.

Alternatively, the controller may determine an elongation length of each of plurality of auxiliary support members with respect to the vehicle body according to a degree of tilt of the vehicle body with respect to the support surface. The elongation length of the auxiliary support member with respect to the vehicle body may be a distance between a distal end of the auxiliary support member and the vehicle body. For instance, in case one support member is coupled to each one of the lateral sides of the vehicle body of a two-wheeled self-balancing vehicle and the vehicle body is tilting while steering, an elongation length of each of the two auxiliary support members with respect to the vehicle body may be different. For example, the elongation length of the auxiliary support member at the inner side of the curve path may be shorter than the elongation length of the auxiliary support member at the outer side of the curve path, due to the tilting orientation of the vehicle body. The elongation length of each of the two auxiliary support members may be respectively determined by the controller according to the tilting orientation of the vehicle body with respect to the support surface, such that the auxiliary support members on both the lateral sides of the vehicle body can contact the support surface. In this case, the auxiliary support member at the inner side of the curve path may contact the support surface to provide stability to the vehicle body, and the auxiliary support member at the outer side of the curve path may provide additional centripetal force to facilitate the steering of the vehicle. For another instance, in case one support member is coupled to each one of the lateral sides of the vehicle body of a two-wheeled self-balancing vehicle and the vehicle is drive or parking on a slope surface (e.g., the longitudinal axis of the vehicle is substantially perpendicular to the fall line of the slope surface, or at least the longitudinal axis of the vehicle is not substantially parallel to the fall line of the slope surface), an elongation length of each of the two auxiliary support members with respect to the vehicle body may be different. In this case, the elongation length of the auxiliary support member at the lower side of the slope surface may be longer than the elongation length of the auxiliary support member at the upper side of the slope surface, such that the orientation of the vehicle body may be maintained substantially upright.

In an example, a self-balancing vehicle may comprise a vehicle body having a longitudinal axis; at least two wheels aligned substantially along the longitudinal axis, each of the at least two wheels being configured to support the vehicle body against a support surface; at least one balancing member disposed within the vehicle body, the balancing member providing self-balancing to the vehicle body while the vehicle body is moving with respect to the support surface; and at least two auxiliary support members coupled to the vehicle body, each of the at least two auxiliary support members providing stability of the vehicle body with respect to the support surface. In some instances, the vehicle may be an electric vehicle driven by an electric motor onboard the vehicle. In some instances, one auxiliary support member may be coupled to each lateral side of the vehicle body. The auxiliary support members may extend away from and/or retract towards the vehicle body independently from one another under the control of a controller.

During a driving of the self-balancing vehicle, the controller may detect the operating state of the one or more balancing members (e.g., a CMG, a flywheel, a shifting weight, or any combination thereof). The detecting of the operating state of the one or more balancing members may be performed at a regular timing. For instance, the controller may detect the operating state of the one or more balancing members every 0.01 msec, 0.05 msec, 0.1 msec, 0.5 msec, 1.0 msec, 2.0 msec, 5.0 msec, 10.0 msec, 20.0 msec, 40.0 msec, 60.0 msec, 80.0 msec, 0.1 sec, 0.2 sec, 0.4 sec, 0.6 sec, 0.8 sec, 1.0 sec or 2.0 sec. If the controller detects that at least one of the one or more balancing members fails (e.g., due to a mechanical malfunction), the controller may direct at least one of the two auxiliary support members or both the two auxiliary support members to extend away from the vehicle body. The extended auxiliary support member may contact the support surface (e.g., the ground on which the vehicle is driving) and provide stability to the vehicle body, such that the vehicle may not flip over or fall down even if the one or more balancing members fails. In some embodiments, the balancing member may send an operating state signal to the controller indicative of an operating state thereof, including an operational state, a fault state and a non-operational state, as discussed elsewhere herein. The operating state signal may be sent from the balancing member to the controller at a regular timing, such as every 0.01 msec, 0.05 msec, 0.1 msec, 0.5 msec, 1.0 msec, 2.0 msec, 5.0 msec, 10.0 msec, 20.0 msec, 40.0 msec, 60.0 msec, 80.0 msec, 0.1 sec, 0.2 sec, 0.4 sec, 0.6 sec, 0.8 sec, 1.0 sec or 2.0 sec. The controller may receive the operating state signal from the balancing member, and direct at least one of the two auxiliary support members or both the two auxiliary support members to extend away from the vehicle body based upon the received operating state signal. For instance, the controller may direct at least one of the two auxiliary support members or both the two auxiliary support members to extend away from the vehicle body when a received operating state signal indicates a fault state of the balancing member.

In some instances, if more than one balancing members are provided onboard the vehicle, the controller may direct at least one of the two auxiliary support members extend away from the vehicle body when one of the balancing members is detected as failed (e.g., 1 out of 3). Alternatively, the controller may direct at least one of the two auxiliary support members extend away from the vehicle body when all of the balancing members are detected as failed (e.g., 3 out of 3). Alternatively, the controller may direct at least one of the two auxiliary support members extend away from the vehicle body when a predetermined number of the balancing members are detected as failed (e.g., 2 out of 3). Alternatively, the controller may direct at least one of the two auxiliary support members extend away from the vehicle body when a predetermined percentage of the balancing members are detected as failed (e.g., 70% out of 100%, rounded to a large integer).

In some embodiments, the at least two auxiliary support members may extend at substantially the same length from the vehicle. For instance, the elongation length of the two auxiliary support members, which are respectively coupled to two lateral sides of the vehicle body driving on a horizontal surface, may be substantially the same, such that the vehicle can be maintained at a neutral orientation (e.g., a vertical orientation) with respect to the horizontal surface. In some instance, the extended at least two auxiliary support members may be coplanar with the at least two wheels. Alternatively, the at least one of the extended two auxiliary support members may be coplanar with the at least two wheels; for example, one of the at least two auxiliary support members may touch against the road surface while the other one may touch against the road shoulder. Alternatively, the at least two auxiliary support members may extend at different lengths from the vehicle. In this case, the controller may determine an elongation length of each of the at least two auxiliary support members with respect to the vehicle body according to a degree of tilt of the vehicle body with respect to the support surface. For instance, if the vehicle is driving on a slope with the longitudinal axis of the vehicle is substantially perpendicular to the fall line of the slope surface, the elongation length of the auxiliary support member at the lower side of the slope surface may be longer than the elongation length of the auxiliary support member at the upper side of the slope surface, such that the orientation of the vehicle body may be maintained substantially upright.

In some embodiments, the at least one extended auxiliary support member may retract back towards the vehicle body if the at least one balancing member restore from the fault state. For instance, if only one balancing member is provided onboard the vehicle, the at least one auxiliary support member, which has extended out to provide stability to the vehicle body during the balancing member's failure, may retract back towards the vehicle body if the controller detects that the operating state of the balancing member is changed to "operational" from "fault" (e.g., the balancing member recovers and can balance the vehicle body again).

In some instances, if more than one balancing members are provided onboard the vehicle, the controller may direct the extended at least one auxiliary support member to retract back towards the vehicle body when the controller detects that the operating states of all the balancing members are changed to "operational" from "fault" (e.g., 3 out of 3). Alternatively, the controller may direct the extended at least one auxiliary support member to retract back towards the vehicle body when the controller detects that the operating states of a predetermined number of balancing members are changed to "operational" from "fault" (e.g., 2 out of 3). Alternatively, the controller may direct the extended at least one auxiliary support member to retract back towards the vehicle body when the controller detects that the operating states of a predetermined percentage of the balancing members are changed to "operational" from "fault" (e.g., 70% out of 100%, rounded to a large integer).

In another example, a self-balancing vehicle may comprise a vehicle body having a longitudinal axis; at least two wheels aligned substantially along the longitudinal axis, each of the at least two wheels being configured to support the vehicle body against a support surface; at least one balancing member disposed within the vehicle body, the balancing member providing self-balancing to the vehicle body while the vehicle body is moving with respect to the support surface; and at least two auxiliary support members coupled to the vehicle body, each of the at least two auxiliary support members providing stability of the vehicle body with respect to the support surface. In some instances, one auxiliary support member may be coupled to each lateral side of the vehicle body. The auxiliary support members may extend away from and/or retract towards the vehicle body independently from one another under the control of the controller.

In some embodiments, the at least two auxiliary support members may extend away from the vehicle to provide stability to the vehicle when the vehicle is steering. When the vehicle is steering (e.g., following a curve path), the vehicle body may tilt towards an inner side of the curve path (e.g., inward in the direction of the curve) such that a component of the force of gravity of the vehicle body may balance the centrifugal force during the steering of the vehicle. In the process of the vehicle's steering, the at least one balancing member may function to balance the vehicle until the at least one balancing member reaches a limit of providing sufficient balancing, as discussed elsewhere herein. For instance, a CMG may reach a limit if the angle of tilt of the vehicle body approaches a certain value. In this case, at least the auxiliary support member at an inner side of the curve path may extend out to provide stability to the vehicle body to avoid a flipping over.

Alternatively or additionally, in the process of the vehicle's steering, the auxiliary support member at an outer side of the curve path may extend out to provide additional centripetal force to facilitate the steering of the vehicle. In some instances, only the auxiliary support member at an outer side of the curve path may extend out to provide additional centripetal force to facilitate the steering of the vehicle, while the auxiliary support member at an inner side of the curve path may not extend out since the at least one balancing member may sufficiently balance the vehicle body.

In some embodiments, the balancing member may send an operating state signal to the controller indicative of an operating state thereof, including an operational state, a fault state and a non-operational state, as discussed elsewhere herein. The operating state signal may be sent from the balancing member to the controller at a regular timing. The controller may receive the operating state signal from the balancing member, and direct at least one of the two auxiliary support members or both the two auxiliary support members to extend away from the vehicle body when a received operating state signal indicates a "reaching limit" state of the balancing member. Alternatively, an orientation sensor (e.g., a gyroscope) may be provided onboard the vehicle in communication with the controller to measure an orientation of the vehicle body. The controller may direct the at least two auxiliary support members to extend out and provide stability to the vehicle body when the measured orientation of the vehicle body with respect to a gravitational acceleration vector reaches a predetermined threshold (e.g., 30 degrees), even if the operating state of the balancing member may indicate an operational state at the current timing.

In some embodiments, the at least one extended auxiliary support member may retract back towards the vehicle body if the at least one balancing member restore from the fault state to an operational state (e.g., the at least one balancing member can sufficiently balance the vehicle body). In this case, the controller may direct the at least one extended auxiliary support member to retract back towards the vehicle body. Alternatively, the at least one extended auxiliary support member may retract back towards the vehicle body if the orientation of the vehicle body is restored back to the predetermined threshold (e.g., an orientation of the vehicle body with respect to the gravitational acceleration vector is less than 30 degree). In this case, the controller may direct the at least one extended auxiliary support member to retract back towards the vehicle body. Alternatively, in case only the auxiliary support member at an outer side of the curve path may extend out to provide additional centripetal force to facilitate the steering of the, the controller may direct the extended auxiliary support member at the outer side of the curve path to retract back towards the vehicle body if the steering of the vehicle completes, for instance, if the orientation of the vehicle body restores to a neutral orientation.

In still another example, a self-balancing vehicle may comprise a vehicle body having a longitudinal axis; at least two wheels aligned substantially along the longitudinal axis, each of the at least two wheels being configured to support the vehicle body against a support surface; at least one balancing member disposed within the vehicle body, the balancing member providing self-balancing to the vehicle body while the vehicle body is moving with respect to the support surface; and at least two auxiliary support members coupled to the vehicle body, each of the at least two auxiliary support members providing stability of the vehicle body with respect to the support surface. In some instances, one auxiliary support member may be coupled to each lateral side of the vehicle body. The auxiliary support members may extend away from and/or retract towards the vehicle body independently from one another under the control of a controller.

In some embodiments, the at least two auxiliary support members may extend away from the vehicle to provide stability to the vehicle when the vehicle is slowing down. The balancing member may consume more power to balance the vehicle body if the vehicle body is driving at a low velocity. For instance, the flywheel, which functions as the balancing member onboard an electric self-balancing vehicle, may have to spin at a higher velocity to provide sufficient balance to the vehicle body if the vehicle is driving at a lower velocity. In this case, the at least two auxiliary support members may extend away from the vehicle to provide stability to the vehicle when a driving velocity of the vehicle decreases to a predetermined velocity (e.g., 15 km/hr), such that the power consumption of the self-balancing vehicle is reduced and a sufficient stability is guaranteed.

In some embodiments, the at least one extended auxiliary support member may retract back towards the vehicle body if the driving velocity of the vehicle increases to the predetermined velocity again from a lower value. For instance, the at least one extended auxiliary support member may retract back towards the vehicle body if the driving velocity of the vehicle increases from 5 kilometers (km)/hour (hr) to 15 km/hr again.

In still another example, a self-balancing vehicle may comprise a vehicle body having a longitudinal axis; at least two wheels aligned substantially along the longitudinal axis, each of the at least two wheels being configured to support the vehicle body against a support surface; at least one balancing member disposed within the vehicle body, the balancing member providing self-balancing to the vehicle body while the vehicle body is moving with respect to the support surface; and at least two auxiliary support members coupled to the vehicle body, each of the at least two auxiliary support members providing stability of the vehicle body with respect to the support surface. In some instances, one auxiliary support member may be coupled to each lateral side of the vehicle body. The auxiliary support members may extend away from and/or retract towards the vehicle body independently from one another under the control of a controller.

In some embodiments, the at least two auxiliary support members may extend away from the vehicle to provide stability to the vehicle when the vehicle temporarily stops, for example, while the vehicle stops at a cross road and waits for a green light for a relatively short period of time. The balancing member may consume more power to balance the vehicle body if the vehicle body is stationary (e.g., zero velocity) with respect to the support surface. For instance, the flywheel, which functions as the balancing member onboard an electric self-balancing vehicle, may have to spin at a higher velocity to provide sufficient balance to the vehicle body if the vehicle is stationary with respect to the support surface. In this case, the at least two auxiliary support members may extend away from the vehicle to provide stability to the vehicle when the vehicle is stationary with respect to the support surface, such that the power consumption of the self-balancing vehicle is reduced and a sufficient stability is guaranteed.

In some instances, the balancing member may operate to provide self-balancing to the vehicle body while the vehicle body is stationary with respect to the support surface. Alternatively, the balancing member may not operate to provide self-balancing to the vehicle body while the vehicle body is stationary with respect to the support surface. In some instances, the controller may direct the at least one balancing member to provide self-balancing to the vehicle body while the vehicle body has transitioned from a temporarily stationary state to a moving state with respect to the support surface. For instance, as soon as the parked vehicle travels again from the temporarily stationary state, the controller may direct the at least one balancing member to operate in order to balance the vehicle body.

In some embodiments, the at least one extended auxiliary support member may retract back towards the vehicle body if a driving velocity of the vehicle increases to a predetermined velocity (e.g., 15 km/hr) and/or a change of the velocity reaches a predetermined acceleration (e.g., 5 m/sec$^2$) and/or the at least one balancing member can sufficiently balance the vehicle body. In some instances, the controller may detect when the vehicle body is capable self-balancing with the aid of the at least one balancing member, and direct the at least two auxiliary support members to retract towards the vehicle body when the vehicle body is capable self-balancing. Alternatively, the controller may detect when a velocity or change thereof (e.g., an acceleration of the vehicle) of the vehicle with respect to the support surface exceeds a threshold, and direct the at least two auxiliary support members to retract towards the vehicle body when the velocity or change thereof of the vehicle body exceeds the threshold. The threshold may be predetermined and may be adjustable by the system (e.g., based on driving conditions) or manually, e.g., by the user.

In still another example, a self-balancing vehicle may comprise a vehicle body having a longitudinal axis; at least two wheels aligned substantially along the longitudinal axis, each of the at least two wheels being configured to support the vehicle body against a support surface; at least one balancing member disposed within the vehicle body, the balancing member providing self-balancing to the vehicle body while the vehicle body is moving with respect to the support surface; and at least two auxiliary support members coupled to the vehicle body, each of the at least two auxiliary support members providing stability of the vehicle body with respect to the support surface. In some instances, one auxiliary support member may be coupled to each lateral side of the vehicle body. The auxiliary support members may extend away from and/or retract towards the vehicle body independently from one another under the control of a controller.

In some embodiments, the at least two auxiliary support members may extend away from the vehicle to provide stability to the vehicle when the vehicle permanently stops, for example, while the vehicle stops at parking lot for a relatively long period of time. The balancing member may consume more power to balance the vehicle body if the vehicle body is stationary (e.g., zero velocity) with respect to the support surface. For instance, the flywheel, which functions as the balancing member onboard an electric self-balancing vehicle, may have to spin at a higher velocity to provide sufficient balance to the vehicle body if the vehicle is stationary with respect to the support surface. In this case, the at least two auxiliary support members may extend away from the vehicle to provide stability to the vehicle when the vehicle permanently stops, such that the power consumption of the self-balancing vehicle is reduced and a sufficient stability is guaranteed.

In some instances, the balancing member may operate to provide self-balancing to the vehicle body while the vehicle body is stationary with respect to the support surface. Alternatively, the balancing member may not operate to provide self-balancing to the vehicle body while the vehicle body is stationary with respect to the support surface. In some instances, the controller may direct the at least one balancing member to provide self-balancing to the vehicle body while the vehicle body has transitioned from a stationary state to a moving state with respect to the support surface. For instance, as soon as the parked vehicle starts up again and travels, the controller may direct the at least one balancing member to operate in order to balance the vehicle body.

In some embodiments, the at least one extended auxiliary support member may retract back towards the vehicle body if the vehicle starts up again from a parking state. For instance, the at least one extended auxiliary support member may retract back towards the vehicle body if the parked vehicle starts up again, and/or a driving velocity of the vehicle increases to a predetermined velocity (e.g., 15 km/hr), and/or the at least one balancing member can sufficiently balance the vehicle body. In some instances, the controller may detect when the vehicle body is capable self-balancing with the aid of the at least one balancing member, and direct the at least two auxiliary support members to retract towards the vehicle body when the vehicle body is capable self-balancing. Alternatively, the controller may detect when a velocity or change thereof (e.g., an acceleration of the vehicle) of the vehicle with respect to the support surface exceeds a threshold, and direct the at least two auxiliary support members to retract towards the vehicle body when the velocity or change thereof of the vehicle body exceeds the threshold.

Figure 6:
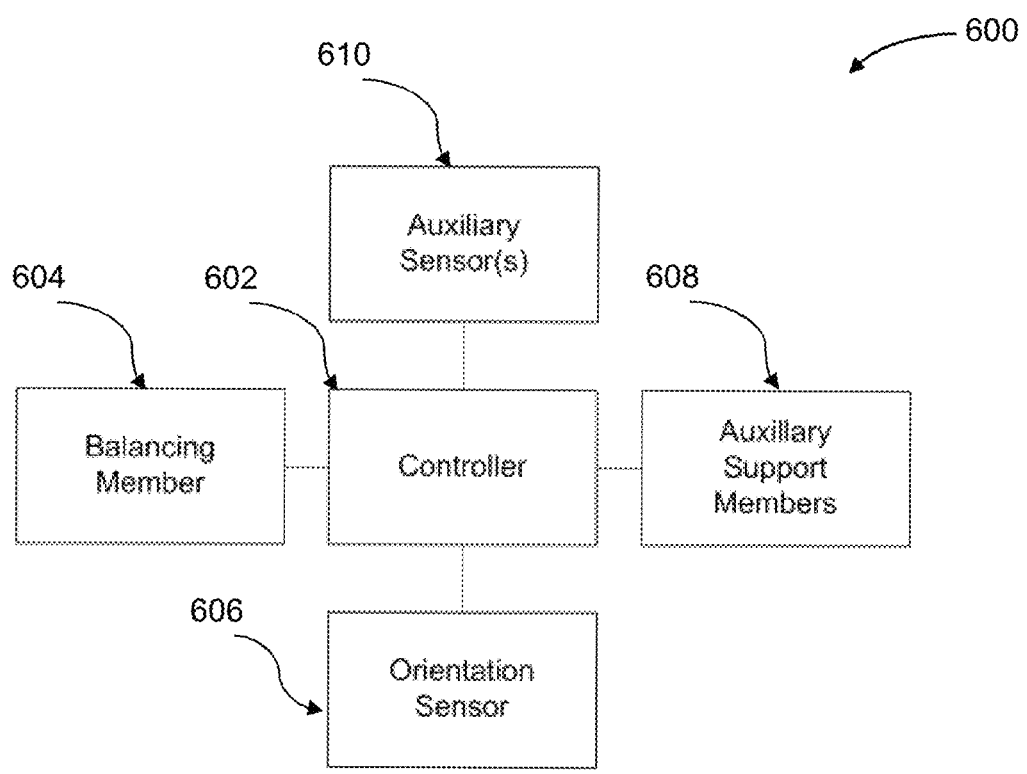
FIG. 6 schematically illustrates another example of a control system for two-wheeled self-balancing vehicles, in accordance with some embodiments of the present disclosure.

FIG. 6 schematically illustrates another example of a control system 600 for two-wheeled self-balancing vehicles, which can be used to regulate auxiliary support members of the two-wheeled self-balancing vehicles. The control system includes a controller 602 may be in communication with one or more balancing member 604, one or more auxiliary support members 608 and one or more auxiliary sensors 610. In some embodiments, the controller may also be communication with an orientation sensor 606 which is optional. The balancing member 604 may facilitate balancing of the vehicle body against the support surface when the one or more auxiliary support members are not in contact with the support surface. The balancing member may be a CMG, a flywheel or a shifting weight, as discussed elsewhere herein. The one or more auxiliary sensors may be provided or integrated on the one or more auxiliary support members to provide auxiliary information to the controller, including but not limited to a distance of the auxiliary support member to the support surface, a velocity of elongation of the auxiliary support member and a state of stability against the support surface. The controller may receive signals from the one or more balancing member and/or the orientation sensor and/or the one or more auxiliary sensors, and instruct the one or more auxiliary support members to extend away from and/or retract towards the vehicle body based upon the received signal(s), thereby stabilizing the vehicle body with respect to the support surface.

In some embodiments, the auxiliary sensor 610 may be a proximity sensor disposed on a distal end of the auxiliary support member to detect proximity/distance of the distal end of the auxiliary support member to the support surface. If more than one auxiliary support members are coupled to the vehicle body of the self-balancing vehicle, the proximity sensor may be provided on a distal end of each one of the plurality of auxiliary support members, or alternatively, on a distal end of one of the plurality of auxiliary support members. In some embodiments, the proximity sensor may be a non-contact sensor.

The proximity sensor may emit an electromagnetic field or a beam of electromagnetic radiation (e.g., infrared or ultrasonic) and detect a change in the field or return signal. The proximity sensor as used in present disclosure may be selected from a group consisting of: a capacitive sensor; a capacitive displacement sensor; a Doppler effect sensor; an eddy-current sensor; an inductive sensor; a laser sensor; a magnetic sensor; a passive optical sensor; a passive thermal infrared sensor; a photocell sensor; a reflective sensor; a radar; a reflection of ionizing radiation sensor; an active or passive sonar; an ultrasonic sensor; a fiber optics sensor; and a Hall effect sensor. In some instances, one proximity sensor may be disposed on a distal end of the auxiliary support member. Alternatively, a plurality of proximity sensors may be disposed on a distal end of the auxiliary support member. In this case, the plurality of proximity sensors may be the same type or different types. The plurality of proximity sensors may be disposed on the distal end of the auxiliary support member in an array. An average value of the measured proximities by the plurality of proximity sensors may be taken as the measured proximity of the distal end of the auxiliary support member to the support surface.

The maximum detecting distance of the proximity sensor, which is the largest distance within which the proximity sensor can detect an object, may be greater than or equal to about 0.01 meters (m), 0.02 m, 0.04 m, 0.06 m, 0.08 m, 0.1 m, 0.2 m, 0.4 m, 0.6 m, 0.8 m, 1.0 m, 1.2 m, 1.4 m, 1.6 m, 1.8 m, 2.0 m, 2.2 m, 2.4 m, 2.6 m, 2.8 m, 3.0 m, 4.0 m, 5.0 m, 6.0 m, 7.0 m, 8.0 m, 9.0 m or 10.0 m. Alternatively, the maximum detecting distance of the proximity sensor may be less than or equal to 10.0 m, 9.0 m, 8.0 m, 7.0 m, 6.0 m, 5.0 m, 4.0 m, 3.0 m, 2.8 m, 2.6 m, 2.4 m, 2.2 m, 2.0 m, 1.8 m, 1.6 m, 1.4 m, 1.2 m, 1.0 m, 0.8 m, 0.6 m, 0.4 m, 0.2 m, 0.1 m, 0.08 m, 0.06 m, 0.04 m, 0.02 m or 0.01 m. For example, the maximum detecting distance of the proximity sensor may be 2.0 m.

In some instances, the controller 602 may receive data from the proximity sensor and determine a velocity of elongation of the one or more auxiliary support members with respect to the vehicle body. For instance, an initial velocity of elongation of the auxiliary support member may be high (for example, at 20 m/sec). With the signal from the proximity sensor the distal end of the auxiliary support member indicating an approach of support surface, the velocity of elongation of the auxiliary support member may be reduced (for example, 1 m/sec before touching the support surface) such that the support from the auxiliary support member may not deteriorate driver and passenger's experience.

Alternatively, the auxiliary sensor 610 may be a stress sensor (also referred to as pressure transducer) disposed on a distal end of the auxiliary support member to detect a stress on the distal end of the auxiliary support member against the support surface. If more than one auxiliary support members are coupled to the vehicle body of the self-balancing vehicle, the stress sensor may be provided on a distal end of each one of the plurality of auxiliary support members, or alternatively, on a distal end of one of the plurality of auxiliary support members. In some embodiments, the stress sensor may be a contact sensor and may be disposed on an axis of the auxiliary wheel which is provided at the distal end of the auxiliary support member.

The stress sensor may use a force collector (such a diaphragm, piston, bourdon tube, or bellows) to measure a strain or a deflection due to applied force over an area of the stress sensor. The proximity sensor as used in present disclosure may be selected from a group consisting of: a piezoresistive sensor (e.g., sensors using the piezoresistive effect of bonded or formed strain gauges to detect strain due to applied pressure, resistance increasing as pressure deforms the material); a capacitive sensor (e.g., sensors using a diaphragm and pressure cavity to create a variable capacitor to detect strain due to applied pressure, capacitance decreasing as pressure deforms the diaphragm); an electromagnetic sensor (e.g., sensors measuring the displacement of a diaphragm with the aid of changes in inductance (reluctance), linear variable differential transformer (LVDT), Hall Effect, or by eddy current principle); a piezoelectric sensor (e.g., sensors using the piezoelectric effect in certain materials such as quartz to measure the strain upon the sensing mechanism due to pressure); an optical sensor (e.g., sensors using the physical change of an optical fiber to detect strain due to applied pressure) and a potentiometric sensor (e.g., sensors using the motion of a wiper along a resistive mechanism to detect the strain caused by applied pressure).

In some instances, one stress sensor may be disposed on a distal end of the auxiliary support member. A plurality of stress sensors may be disposed on a distal end of the auxiliary support member. In this case, the plurality of stress sensors may be the same type or different types. The plurality of stress sensors may be disposed on the distal end of the auxiliary support member in an array. An average value of the measured stress by the plurality of stress sensors may be taken as the measured stress of the distal end of the auxiliary support member against the support surface.

The minimum detectable stress of the stress sensor may be less than or equal to about 1,000 psi (pounds per square inch), 900 psi, 800 psi, 700 psi, 600 psi, 500 psi, 450 psi, 400 psi, 350 psi, 300 psi, 250 psi, 200 psi, 150 psi, 100 psi, 80 psi, 60 psi, 40 psi, 20 psi, 10 psi, 5.0 psi, 1.0 psi, 0.5 psi, 0.1 psi, 0.05 psi or 0.01 psi. Alternatively, the minimum detectable stress of the stress sensor may be greater than or equal to 0.01 psi (pounds per square inch), 0.05 psi, 0.1 psi, 0.5 psi, 1.0 psi, 5.0 psi, 10 psi, 20 psi, 40 psi, 60 psi, 80 psi, 100 psi, 150 psi, 200 psi, 250 psi, 300 psi, 350 psi, 400 psi, 450 psi, 500 psi, 600 psi, 700 psi, 800 psi, 900 psi or 1,000 psi. The maximum detectable stress of the stress sensor may be less than or equal to about 50,000 psi, 45,000 psi, 40,000 psi, 35,000 psi, 30,000 psi, 25,000 psi, 20,000 psi, 15,000 psi, 10,000 psi, 9,500 psi, 9,000 psi, 8,500 psi, 8,000 psi, 7,500 psi, 7,000 psi, 6,500 psi, 6,000 psi, 5,500 psi, 5,000 psi, 4,500 psi, 4,000 psi, 3,500 psi, 3,000 psi, 2,500 psi, 2,000 psi, 1,500 psi or 1,000 psi. Alternatively, the maximum detectable stress of the stress sensor may be greater than or equal to 1,000 psi, 1,500 psi, 2,000 psi, 2,500 psi, 3,000 psi, 3,500 psi, 4,000 psi, 4,500 psi, 5,000 psi, 5,500 psi, 6,000 psi, 6,500 psi, 7,000 psi, 7,500 psi, 8,000 psi, 8,500 psi, 9,000 psi, 9,500 psi, 10,000 psi, 15,000 psi, 20,000 psi, 25,000 psi, 30,000 psi, 35,000 psi, 40,000 psi, 45,000 psi or 50,000 psi.

In some instances, the controller 602 may receive data from the stress sensor and determine to determine a state of stability of the vehicle with respect to the support surface. For instance, while parking the vehicle by extending out the one or more auxiliary support member, the controller may determine that the vehicle is stably supported by the one or more auxiliary support members against the support surface if the stress applied on the distal end of the one or more auxiliary support members exceeds a predetermined threshold.

Alternatively, the one or more auxiliary sensors 610 may include a proximity sensor that detects proximity of the distal end of the auxiliary support member to the support surface and a stress sensor that detects a stress on the distal end of the auxiliary support member against the support surface. In some instances, the controller 602 may combine data from the proximity sensor and the stress sensor to determine a velocity of elongation of the auxiliary support member with respect to the vehicle body and a state of stability of the vehicle with respect to the support surface. For instance, while parking the vehicle on a surface covered by snow, sand, mud, grass and/or shrub by extending out the one or more auxiliary support member, the velocity of elongation of the auxiliary support member may be decreased from a higher initial value (e.g., 20 m/sec) to a lower value (e.g., 1 m/sec) with the signal from the proximity sensor the distal end of the auxiliary support member indicating an approach of support surface. However, while the signal from the proximity sensor indicates that the distance from the proximity sensor to the "ground" is zero, the distal end of the auxiliary support member actually may touch the snow rather than the real ground. In this case, the controller may direct the auxiliary support member continue to extend out until the signal from the stress sensor indicates that the stress applied on the distal end of the auxiliary support member exceeds a predetermined threshold. The combined date from the proximity sensor and the stress sensor can enable the auxiliary support member to extend to a true support surface as opposed to stopping on a false surface, which can aid in improving reliability and stability provided by the one or more auxiliary support members. The combination of a proximity sensor and a stress sensor may improve reliability and stability provided by the one or more auxiliary support members in scenarios including, but not limited to, vehicle steering, vehicle slowing down and self-balancing member failing, etc, as discussed elsewhere herein.

In some instance, in case one or more proximity sensor and one or more stress sensor are disposed at the distal end of the auxiliary support member, a scaling factor (e.g., a weight) may be assigned to the data received from respective sensor. For instance, a scaling factor A may be assigned to data received from the proximity sensor and a scaling factor B may be assigned to data received from the stress sensor. The scaling factors A and B may be programmed by the manufacture of the vehicle and/or can be adjusted by the user. For instance, the data received from the proximity sensor may be assigned with a larger scaling factor since the velocity of elongation of the auxiliary support member is a priority to guarantee a safety and stability of the vehicle.

Figure 7:
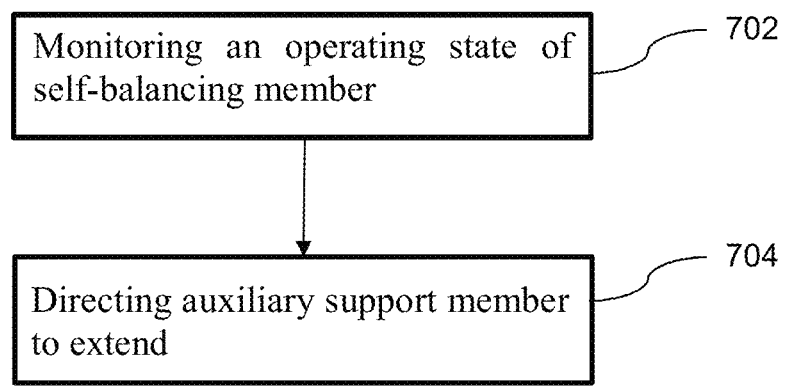
FIG. 7 schematically illustrates a method of operating a vehicle, such as a self-balancing vehicle, in accordance with some embodiments of the present disclosure.

FIG. 7 is a flow chart schematically illustrating a method of operating a vehicle, such as a self-balancing vehicle. The vehicle may comprise a vehicle body having a longitudinal axis; at least two wheels aligned substantially along the longitudinal axis, wherein each of the at least two wheels is configured to support the vehicle body against a support surface; at least two auxiliary support members coupled to the vehicle body, wherein the at least two auxiliary support members extend away from and/or retract towards the vehicle body independently from one another, wherein each of the at least two auxiliary support members provides stability of the vehicle body with respect to the support surface; at least one balancing member disposed within the vehicle body, wherein the balancing member facilitates self-balancing of the vehicle body against the support surface; and a controller in communication with the at least two auxiliary support members and the at least one balancing member, wherein the controller comprises one or more computer processors that are individually or collectively programmed to direct at least one of the at least two auxiliary support members to extend away from and/or retract towards the vehicle body based upon an operating state or change thereof of the vehicle, which operating state is selected from the group consisting of an operating state of the at least one balancing member and an orientation of the vehicle body with respect to the support surface, thereby stabilizing the vehicle body with respect to the support surface.

In operation 702, an operating state of the self-balancing vehicle adjacent to a support surface may be monitored. In some instances, the monitoring may comprise detecting the operating state of the vehicle or change thereof and/or a degree of tilt with respect to the gravitational acceleration vector. Next, in operation 704, at least one of the at least two auxiliary support members may be directed to extend away from and/or retract towards the vehicle body based upon the operating state or change thereof of the vehicle, thereby stabilizing the vehicle body with respect to the support surface. For instance, if the operating state of the vehicle is changed from an operational state to a fault state, the controller may direct the at least two auxiliary support members may be directed to extend away from the vehicle body and provide stability to the vehicle body.

In some embodiments, the method of operating a self-balancing vehicle may controls the at least two auxiliary support members to extend away from and/or retract towards the vehicle body in scenarios including but not limited to the at least one balancing member fails, the vehicle is steering, the vehicle is slowing down, the vehicle is in temporary stationary and/or the vehicle is in permanent stationary, as discussed elsewhere herein.

Figure 8:
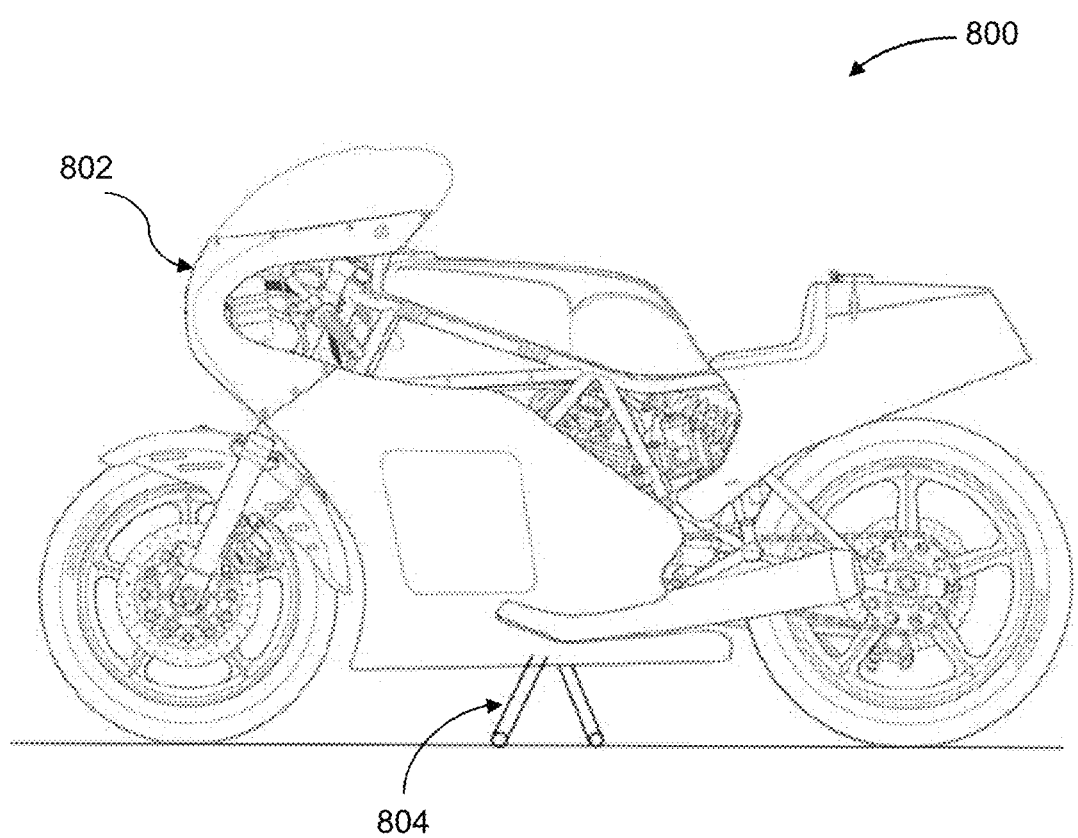
FIG. 8 schematically illustrates an example of a two-wheeled vehicle having auxiliary support members, in accordance with some embodiments of the present disclosure.

FIG. 8 schematically illustrates an example of a two-wheeled vehicle having auxiliary support members, in accordance with some embodiments of the present disclosure. The two-wheeled vehicle 802 may be an ordinary vehicle having two wheels, such as a bicycle, a motorcycle, a scooter, etc., which has no self-balancing ability. The two-wheeled vehicle 802 includes two auxiliary support members 804 that are coupled to a vehicle body of the two-wheeled vehicle 802, and may be directed by a controller onboard the vehicle to extend away from and/or retract towards the vehicle body independently from each other. The spatial arrangement of the wheels with respect to the vehicle body, the spatial arrangement of the two wheels with respect to one another and the number and/or spatial arrangement of motor may be identical to those as discussed with reference to FIGS. 1-4 elsewhere herein.

The auxiliary support members 804 may be provided on lateral sides (e.g., in a direction substantially perpendicular to the longitudinal axis of the vehicle) of the vehicle body. The auxiliary support member may be coupled to the vehicle body at arbitrary position along the longitudinal axis thereof. In some instances, the auxiliary support member may be coupled to the vehicle body at a substantially middle portion thereof. Alternatively, the auxiliary support member may be coupled to the vehicle body at a relatively rear portion thereof. Alternatively, the auxiliary support member may be coupled to the vehicle body at a relatively front portion thereof.

In some embodiments, at least one auxiliary support member may be provided at each one of lateral sides of the vehicle body. Alternatively, one or more auxiliary support members may be provided on only one lateral side of the vehicle body, as discussed elsewhere herein (e.g., in the context of FIG. 4). The extending and retracting of the auxiliary support members 804 may be implemented in various mechanisms. In some embodiments, the auxiliary support member may include a telescopic rod which is retractable away and/or toward the vehicle body. Alternatively, the auxiliary support member may include a foldable rod which is foldable away and/or toward the vehicle body by way of rotating with respect to the vehicle body. In some embodiments, the auxiliary support member may be positioned substantially beneath the vehicle body when in a retracted state. Alternatively, the auxiliary support member may be positioned substantially above the vehicle body when in a retracted state. Alternatively, the auxiliary support member may be positioned substantially parallel with the vehicle body when in a retracted state. Alternatively, the auxiliary support member may be positioned with an arbitrary angle with respect to the vehicle body when in a retracted state. In some embodiments, the auxiliary support member may include one or more auxiliary wheels and/or tracks at a distal end thereof. The auxiliary wheels and/or tracks may be steerable.

An orientation sensor (e.g., a gyroscope) may be provided onboard the vehicle in communication with a controller to measure a degree of tilt and/or a change thereof of the vehicle body. In some embodiments, the controller may direct the one or more auxiliary support members to extend out to touch the support surface and provide stability to the vehicle body when the measured degree of tilt of the vehicle body with respect to a gravitational acceleration vector reaches a predetermined threshold (e.g., 30 degrees). Alternatively, the controller may direct the one or more auxiliary support members to extend out and provide stability to the vehicle body when the measured change of degree of tilt of the vehicle body reaches a predetermined value (e.g., 5 degree/sec). Alternatively, the controller may direct the one or more auxiliary support members to extend out and provide stability to the vehicle body when the measured degree of tilt of the vehicle body with respect to a gravitational acceleration vector reaches a predetermined threshold (e.g., 30 degrees) or the measured change of degree of tilt of the vehicle body reaches a predetermined value (e.g., 5 degree/sec). In some instances, the predetermined threshold of the degree of tilt of the vehicle body with respect to a gravitational acceleration vector may be predetermined according to a driving mode of the vehicle. For example, the threshold under a "sport mode" may be set larger than that under a "snow mode", such that the vehicle under the "sport mode" can tilt a larger angle with respect to a gravitational acceleration vector.

In some embodiments, the auxiliary support member may extend out before the measured degree of tilt of the vehicle body with respect to a gravitational acceleration vector reaches the predetermined threshold. Alternatively, the auxiliary support member may extend out upon the measured degree of tilt of the vehicle body with respect to a gravitational acceleration vector reaches the predetermined threshold. Alternatively, the auxiliary support member may extend out after the measured degree of tilt of the vehicle body with respect to a gravitational acceleration vector reaches the predetermined threshold.

In some embodiments, the one or more extended auxiliary support member may retract back towards the vehicle body if an orientation of the vehicle body is restored back to the predetermined threshold (e.g., a degree of tilt of the vehicle body with respect to the gravitational acceleration vector is less than 30 degrees).

Figure 9:
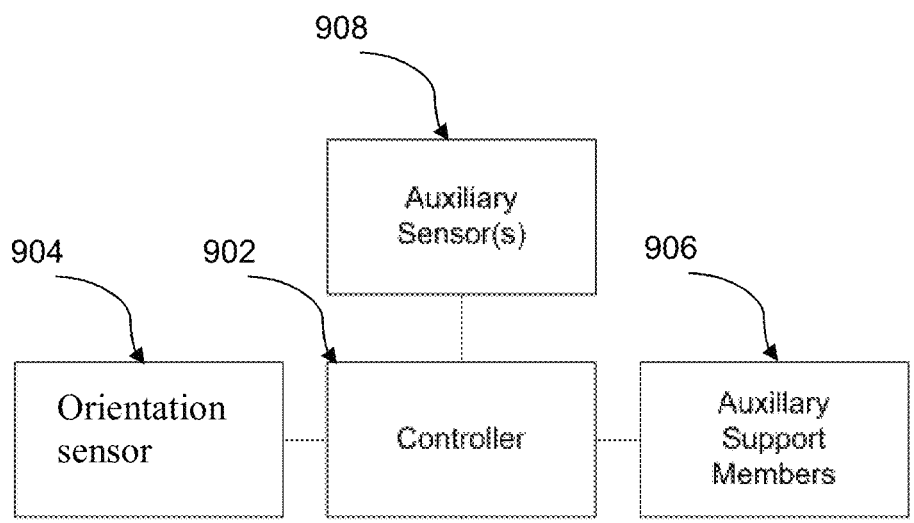
FIG. 9 schematically illustrates an example of a control system for two-wheeled vehicles, in accordance with some embodiments of the present disclosure.

FIG. 9 schematically illustrates an example of a control system for two-wheeled self-balancing vehicles, which can be used to regulate auxiliary support members of the two-wheeled self-balancing vehicles. The control system includes a controller 902 that may be in communication with an orientation sensor 904 and one or more auxiliary support members 906. In some embodiments, the controller 902 may also be in communication with one or more auxiliary sensors 908 which may be optional. The balancing member 604 may facilitate balancing of the vehicle body against the support surface when the one or more auxiliary support members are not in contact with the support surface. The one or more auxiliary sensors may be provided or integrated on the one or more auxiliary support members to provide auxiliary information to the controller, including but not limited to a distance of the auxiliary support member to the support surface, a velocity of elongation of the auxiliary support member and a state of stability against the support surface. The controller may receive signals from the orientation sensor and/or the one or more auxiliary sensors, and instruct the one or more auxiliary support members to extend away from and/or retract towards the vehicle body based upon the received signal(s), thereby stabilizing the vehicle body with respect to the support surface.

In some embodiments, the auxiliary sensor 906 may be a proximity sensor disposed on a distal end of the auxiliary support member to detect proximity/distance of the distal end of the auxiliary support member to the support surface. The proximity sensor may be a non-contact sensor and may be disposed on an axis of the auxiliary wheel which is provided at the distal end of the auxiliary support member. In some instances, the controller may receive data from the proximity sensor and determine a velocity of elongation of the one or more auxiliary support members with respect to the vehicle body. Alternatively, the auxiliary sensor may be a stress sensor (also referred to as pressure transducer) disposed on a distal end of the auxiliary support member to detect a stress on the distal end of the auxiliary support member against the support surface. The stress sensor may be a contact sensor and may be disposed on an axis of the auxiliary wheel which is provided at the distal end of the auxiliary support member. In some instances, the controller may receive data from the stress sensor and determine to determine a state of stability of the vehicle with respect to the support surface. Alternatively, the one or more auxiliary sensors may include a proximity sensor that detects proximity of the distal end of the auxiliary support member to the support surface and a stress sensor that detects a stress on the distal end of the auxiliary support member against the support surface. In some instances, the controller may combine data from the proximity sensor and the stress sensor to determine a velocity of elongation of the auxiliary support member with respect to the vehicle body and a state of stability of the vehicle with respect to the support surface. In some instance, in case one or more proximity sensor and one or more stress sensor are disposed at the distal end of the auxiliary support member, a scaling factor (e.g., a weight) may be assigned to the data received from respective sensor, as discussed elsewhere herein with reference to FIG. 6.

Figure 10:
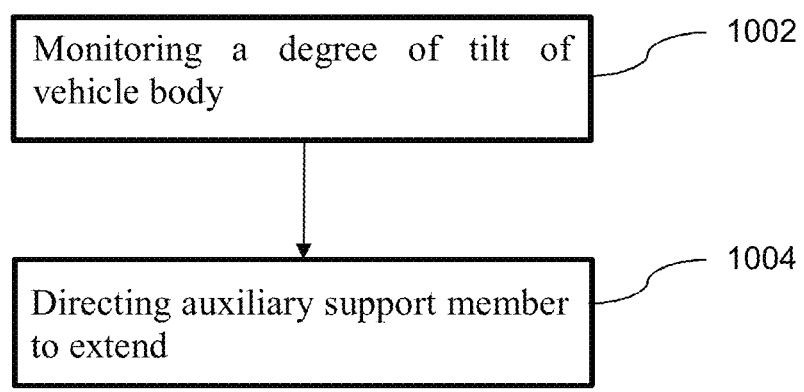
FIG. 10 schematically illustrates a method of operating a vehicle, in accordance with some embodiments of the present disclosure.

FIG. 10 is a flow chart schematically illustrating a method of operating a vehicle. The vehicle may comprise (i) a vehicle body having a longitudinal axis, (ii) at least two wheels aligned substantially along the longitudinal axis, wherein each of the at least two wheels supports the vehicle body against a support surface, (iii) at least one sensor that measures a degree of tilt or change thereof of the vehicle body with respect to the support surface, and (iv) at least two auxiliary support members coupled to the vehicle body, the at least two auxiliary support members extending away from and/or retracting towards the vehicle body independently from one another, wherein each of the at least two auxiliary support members provides stability of the vehicle body with respect to the support surface.

In operation 1002, a degree of tilt or change thereof (e.g., first or second derivative of the tilt as a function of time) of the vehicle body of the vehicle with respect to a support surface may be monitored. The degree of tilt or change thereof may be determined relative to a reference. For example, a controller of the vehicle may determine a reference tilt when the vehicle is on a level or substantially level surface, and measure the degree of tilt or change thereof relative to the reference.

In operation 1004, at least one of the at least two auxiliary support members may be directed to extend away from and/or retract towards the vehicle body based on the degree of tilt or change thereof of the vehicle body with respect to the support surface.

In some embodiments, the method of operating a vehicle may direct the one or more auxiliary support members to extend out to touch the support surface and provide stability to the vehicle body when the measured degree of tilt of the vehicle body with respect to a gravitational acceleration vector reaches a predetermined threshold (e.g., 30 degrees). Alternatively, the method of operating a vehicle may direct the one or more auxiliary support members to extend out and provide stability to the vehicle body when the measured change of degree of tilt of the vehicle body reaches a predetermined value (e.g., 5 degree/sec). Alternatively, the method of operating a vehicle may direct the one or more auxiliary support members to extend out and provide stability to the vehicle body when the measured degree of tilt of the vehicle body with respect to a gravitational acceleration vector reaches a predetermined threshold (e.g., 30 degrees) or the measured change of degree of tilt of the vehicle body reaches a predetermined value (e.g., 5 degree/sec).

Figure 11:
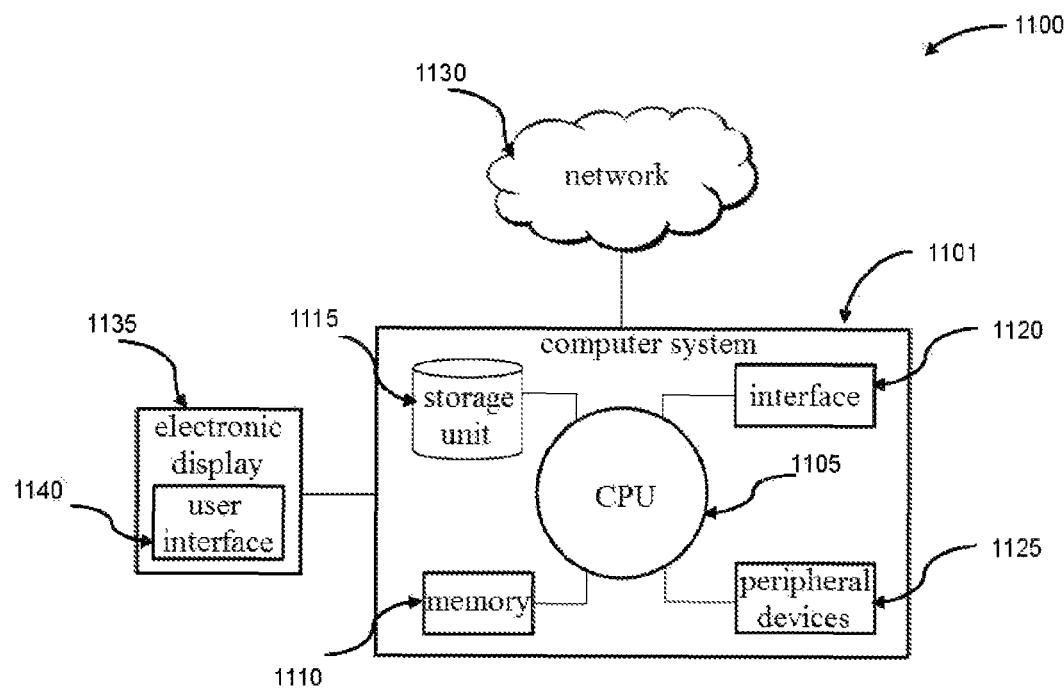
FIG. 11 schematically illustrates an example of a computer control system that is programmed or otherwise configured to implement methods provided herein, in accordance with some embodiments of the present disclosure.

The present disclosure provides computer control systems that are programmed to implement methods of the disclosure. FIG. 11 shows an example of a computer system 1101 that is programmed or otherwise configured to operating a self-balancing vehicle or a vehicle. The computer system 1101 can regulate various aspects of the self-balancing vehicle or the vehicle of the present disclosure, such as, for example, extending out and/or retracting back the auxiliary support members.

The computer system 1101 may include a central processing unit (CPU, also "processor" and "computer processor" herein) 1105, which can be a single core or multi core processor, or a plurality of processors for parallel processing. The computer system 1101 may also include memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 may be in communication with the CPU 1105 through a communication bus (solid lines), such as a motherboard. The storage unit 1115 can be a data storage unit (or data repository) for storing data. The computer system 1101 can be operatively coupled to a computer network ("network") 1130 with the aid of the communication interface 1120. The network 1130 can be the Internet, an internet and/or extranet, or an intranet and/or extranet that is in communication with the Internet. The network 1130 in some cases may be a telecommunication and/or data network. The network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server.

The CPU 1105 can execute a sequence of machine-readable instructions, which can be embodied in a program or software. The instructions may be stored in a memory location, such as the memory 1110. The instructions can be directed to the CPU 1105, which can subsequently program or otherwise configure the CPU 1105 to implement methods of the present disclosure. Examples of operations performed by the CPU 1105 can include fetch, decode, execute, and write-back.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

The computer system 1101 can communicate with one or more remote computer systems through the network 1130. For instance, the computer system 1101 can communicate with a remote computer system of a user. Examples of remote computer systems may include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1101 via the network 1130.

Methods as described herein can be implemented by way of machine (e.g., computer processor) executable code stored on an electronic storage location of the computer system 1101, such as, for example, on the memory 1110 or electronic storage unit 1115. The machine executable or machine readable code can be provided in the form of software. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display 1135 that comprises a user interface (UI) 1140 for providing, for example, degree of tile of the vehicle body, operating state of the self-balancing members, driving velocity of the vehicle, extending/retracting status of the auxiliary support members. Examples of UI's include, without limitation, a graphical user interface (GUI) and web-based user interface.

Figure 12:
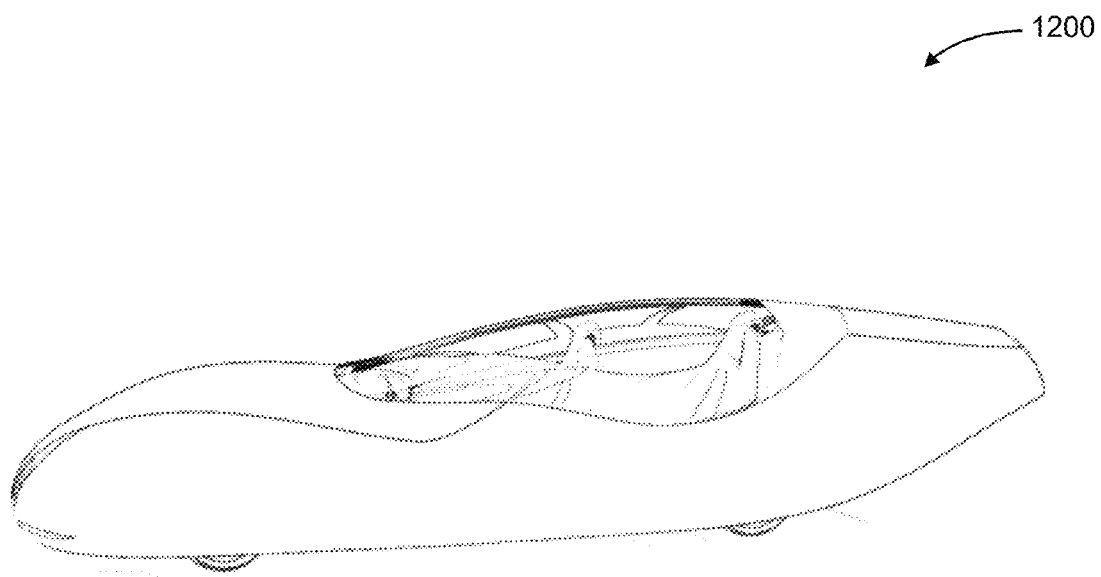
FIG. 12 illustrates an example of a two-wheeled vehicle, in accordance with embodiments of the present disclosure.

FIG. 12 illustrates an example of a two-wheeled vehicle, in accordance with embodiments of the present disclosure.

The systems, devices, and methods described herein can be applied to a wide variety of vehicles, including mono (or single) wheeled vehicle, two-wheeled vehicle and three wheeled vehicle. A mono-wheeled vehicle or a three-wheeled vehicle may turn over if compared to a four wheeled vehicle, and may require auxiliary support members to provide stability.

The systems, devices, and methods described herein can be applied to a wide variety of movable objects. The movable object may be capable of moving freely along one, two or three degrees of freedom. For example, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a motor, as described elsewhere herein, or by a user. The propulsion system may be run on an energy source, such as electrical energy, magnetic energy, solar energy, wind energy, gravitational energy, chemical energy, nuclear energy, or any suitable combination thereof. Alternatively, the movable object may be carried by a living being, such as by a user pedaling.

The movable object can be controlled remotely by a user or controlled locally by an occupant within or on the movable object. The movable object may be controlled remotely via an occupant within a separate vehicle. In some embodiments, the movable object is vehicle, such as a mono-wheel vehicle, a two wheeled vehicle, or a three wheeled vehicle. The movable object may be manned or unmanned. An unmanned object may not have an occupant onboard the movable object. The unmanned object may be controlled by a computer, such as a robot. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be greater than a size and/or dimension suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 10,000 kg. The weight of the movable object may be less than or equal to about: 9,000 kg, 8,000 kg, 7,000 kg, 6,000 kg, 5,000 kg, 4,000 kg, 3000 kg, 2,000 kg, 1,000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, the movable object may have low energy consumption. For example, the movable object may use less than about: 50 W/h, 40 W/h, 30 W/h, 20 W/h, 10 W/h, 5 W/h, 4 W/h, 3 W/h, 2 W/h, 1 W/h, or less.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. The load may be movable relative to the movable object (e.g., translatable or rotatable relative to the movable object). The load can include a payload and/or a carrier, as described elsewhere herein.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A self-balancing vehicle, comprising:
   a vehicle body having a longitudinal axis;
   at least two wheels aligned substantially along said longitudinal axis, wherein each of said at least two wheels is configured to support said vehicle body against a support surface;
   at least two auxiliary support members coupled to said vehicle body, wherein said at least two auxiliary support members extend away from and/or retract towards said vehicle body independently from one another without any input from a user of said self-balancing vehicle, such that at least one of the at least two auxiliary support members contributes to stability of said vehicle body with respect to said support surface;
   at least one balancing member coupled to said vehicle body, wherein said balancing member provides self-balancing of said vehicle body against said support surface;
   at least one sensor in said vehicle body, wherein said at least one sensor is configured to detect a tilt angle of said vehicle body with respect to said support surface; and
   a controller in communication with said at least two auxiliary support members, said at least one balancing member and said at least one sensor, wherein said controller comprises one or more computer processors that are individually or collectively programmed to:
   (i) use said at least one sensor to detect said tilt angle of said vehicle body with respect to said support surface when said self-balancing vehicle is in motion, and
   (ii) determine whether said tilt angle detected in (i) exceeds a threshold such that said at least one balancing member does not provide sufficient stability to facilitate self-balancing of said vehicle body with respect to said support surface when said self-balancing vehicle is in motion and said at least one balancing member is in an operational state; and
   (iii) direct at least one of said at least two auxiliary support members to extend away from said vehicle body in an independent manner when said tilt angle is determined to exceed said threshold, thereby providing stability to said self-balancing vehicle against said support surface while said self-balancing vehicle is in motion.

2. The self-balancing vehicle of claim 1, wherein said balancing member facilitates balancing of said vehicle body against said support surface when said at least two auxiliary support members are not in contact with said support surface.

3. The self-balancing vehicle of claim 1, wherein at least one of said at least two auxiliary support members includes an auxiliary wheel that is configured to contact said support surface.

4. The self-balancing vehicle of claim 1, wherein said at least one of said at least two auxiliary support members includes a telescopic rod or a foldable rod.

5. The self-balancing vehicle of claim 1, wherein said one or more computer processors are individually or collectively programmed to direct said at least two auxiliary support members to extend away from said vehicle body to provide stability to said vehicle body against said support surface when said balancing member is in a faulty state or non-operational state.

6. The self-balancing vehicle of claim 1, wherein said one or more computer processors are individually or collectively programmed to direct said at least two auxiliary support members to extend at substantially the same length from said vehicle body.

7. The self-balancing vehicle of claim 1, wherein when extended, at least one of said at least two auxiliary support members is coplanar with said at least two wheels.

8. The self-balancing vehicle of claim 1, wherein said one or more computer processors are individually or collectively programmed to determine an elongation length of each of said at least two auxiliary support members with respect to said vehicle body according to a degree of tilt of said vehicle body with respect to said support surface.

9. The self-balancing vehicle of claim 8, wherein an elongation length of each of said at least two auxiliary support members with respect to said vehicle body is different while said vehicle is steering.

10. The self-balancing vehicle of claim 1, wherein said one or more computer processors are individually or collectively programmed to direct said at least one of said at least two auxiliary support members to extend away from said vehicle body to restore said vehicle body to an additional tilt angle which is less than said threshold.

11. The self-balancing vehicle of claim 10, wherein said one or more computer processors are individually or collectively programmed to direct said at least one of said at least two auxiliary support members to retract towards said vehicle body after said vehicle body is restored to said additional tilt angle which is less than said threshold.

12. The self-balancing vehicle of claim 1,
wherein said at least one balancing member includes a control moment gyroscope (CMG), and
wherein said operating state of said CMG is determined based upon whether a gimbal angle of said CMG with respect to said vehicle body reaches a predetermined gimbal angle limit.

13. The self-balancing vehicle of claim 1, wherein said balancing member does not provide self-balancing to said vehicle body while said vehicle body is stationary with respect to said support surface.

14. The self-balancing vehicle of claim 1, wherein said one or more computer processors are individually or collectively programmed to direct at least one of said at least two auxiliary support members to extend away from said vehicle body to provide stability to said vehicle body against said support surface when said vehicle body is stationary with respect to said support surface.

15. The self-balancing vehicle of claim 1, wherein said one or more computer processors are individually or collectively programmed to direct said balancing member to provide self-balancing to said vehicle body when said vehicle body has transitioned from a stationary state to a moving state with respect to said support surface.

16. The self-balancing vehicle of claim 1, wherein said one or more computer processors are individually or collectively programmed to:
detect when said vehicle body is capable of self-balancing with the aid of said balancing member, and
direct said at least one of said at least two auxiliary support members to retract towards said vehicle body when said vehicle body is capable of self-balancing.

17. The self-balancing vehicle of claim 1, wherein said one or more computer processors are individually or collectively programmed to:
detect when a velocity or change thereof of said vehicle body with respect to said support surface exceeds a threshold, and
direct said at least one of said at least two auxiliary support members to retract towards said vehicle body when said velocity or change thereof of said vehicle body exceeds said threshold.

18. The self-balancing vehicle of claim 1, wherein said one or more computer processors are individually or collectively programmed to:
detect a velocity or change thereof of said vehicle with respect to said support surface, and
direct at least one of said at least two auxiliary support members to extend away from said vehicle body to provide stability to said vehicle body against said support surface when said velocity or change thereof of said vehicle body is below a threshold.

19. The self-balancing vehicle of claim 1, further comprising one or more sensors on at least one of said at least two auxiliary support members, wherein said one or more sensors includes a proximity sensor that detects proximity to said support surface and/or a stress sensor that detects stress on said at least one of said at least two auxiliary support members.

20. The self-balancing vehicle of claim 1, wherein said one or more computer processors are individually or collectively programmed to determine a speed of elongation of said at least one of said at least two auxiliary support members with respect to said vehicle body.

21. A method for operating a self-balancing vehicle, comprising:
(a) monitoring an operating state of said self-balancing vehicle adjacent to a support surface, wherein said self-balancing vehicle comprises:
(i) a vehicle body having a longitudinal axis,
(ii) at least two wheels aligned substantially along said longitudinal axis, wherein each of said at least two wheels supports said vehicle body against said support surface,
(iii) at least two auxiliary support members coupled to said vehicle body, wherein said at least two auxiliary support members extend away from and/or retract towards said vehicle body independently from one another without any input from a user of said self-balancing vehicle, and wherein each of said at least two auxiliary support members contributes to stability of said vehicle body with respect to said support surface;
(iv) at least one balancing member coupled to said vehicle body, wherein said balancing member provides self-balancing of said vehicle body against said support surface; and
(v) at least one sensor in said vehicle body, wherein said at least one sensor is configured to detect a tilt angle of said vehicle body with respect to said support surface;
(b) using said at least one sensor to detect said tilt angle of said vehicle body with respect to said support surface when said self-balancing vehicle is in motion;
(c) determining whether said tilt angle detected in (b) exceeds a threshold such that said at least one balancing member does not provide sufficient stability to facilitate self-balancing of said vehicle body with respect to said support surface when said self-balancing vehicle is in motion and said at least one balancing member is in an operational state; and
(d) directing at least one of said at least two auxiliary support members to extend away from said vehicle body in an independent manner when said tilt angle is determined to exceed said threshold, thereby providing stability to said self-balancing vehicle against said support surface while said self-balancing vehicle is in motion.

22. The method of claim 21, wherein said balancing member facilitates balancing of said vehicle body against said support surface when said at least two auxiliary support members are not in contact with said support surface.

23. The method of claim 21,
wherein said state of said at least one balancing member is indicative of said balancing member being in a faulty state or non-operational state, and
wherein said directing comprises directing said at least two auxiliary support members to extend away from said vehicle body to provide stability to said vehicle body against said support surface when said balancing member is in said faulty state or non-operational state.

24. A control system comprising one or more computer processors that are individually or collectively programmed to implement a method for operating a self-balancing vehicle, the method comprising:
   (a) monitoring an operating state of said self-balancing vehicle adjacent to a support surface, wherein said self-balancing vehicle comprises:
      (i) a vehicle body having a longitudinal axis,
      (ii) at least two wheels aligned substantially along said longitudinal axis, wherein each of said at least two wheels supports said vehicle body against said support surface,
      (iii) at least two auxiliary support members coupled to said vehicle body, wherein said at least two auxiliary support members extend away from and/or retract towards said vehicle body independently from one another without any input from a user of said self-balancing vehicle, and wherein each of said at least two auxiliary support members contributes to stability of said vehicle body with respect to said support surface; and
      (iv) at least one balancing member coupled to said vehicle body, wherein said balancing member provides self-balancing of said vehicle body against said support surface;
      (v) at least one sensor in said vehicle body, wherein said at least one sensor is configured to detect a tilt angle of said vehicle body with respect to said support surface;
   (b) using said at least one sensor to detect said tilt angle of said vehicle body with respect to said support surface when said self-balancing vehicle is in motion;
   (c) determining whether said tilt angle detected in (b) exceeds a threshold such that said at least one balancing member does not provide sufficient stability to facilitate self-balancing of said vehicle body with respect to said support surface when said self-balancing vehicle is in motion and said at least one balancing member is in an operational state; and
   (d) directing at least one of said at least two auxiliary support members to extend away from said vehicle body in an independent manner when said tilt angle is determined to exceed said threshold, thereby providing stability to said self-balancing vehicle against said support surface while said self-balancing vehicle is in motion.

25. The control system of claim 24, wherein said directing comprises directing said at least two auxiliary support members to extend away from said vehicle body to provide stability to said vehicle body against said support surface when said balancing member is in a faulty state or non-operational state.

26. The self-balancing vehicle of claim 1, wherein said motion includes undergoing a turn.

27. The self-balancing vehicle of claim 1, wherein said at least two auxiliary support members extend away from and/or retract towards said vehicle body independently from one another such that at least one of the at least two auxiliary support members contributes to stability of said vehicle body with respect to said support surface when said vehicle is in motion.

28. The self-balancing vehicle of claim 1, wherein said one or more computer processors are individually or collectively programmed to direct said at least one of said at least two auxiliary support members to retract towards said vehicle body when said tilt angle is less than said threshold.

* * * * *